US011513929B2

(12) United States Patent
Roest et al.

(10) Patent No.: US 11,513,929 B2
(45) Date of Patent: Nov. 29, 2022

(54) SYSTEMS AND METHODS FOR AUTOMATED UPTIME MONITORING OF INTERNET-BASED SOFTWARE

(71) Applicant: INCONTACT, INC., Salt Lake City, UT (US)

(72) Inventors: Paul Lin Roest, Salt Lake City, UT (US); Arunkumar Anandhan, Sandy, UT (US)

(73) Assignee: NICE LTD., Ra'anana (IL)

( * ) Notice: Subject to any disclaimer, the term of this patent is extended or adjusted under 35 U.S.C. 154(b) by 279 days.

(21) Appl. No.: 16/849,171

(22) Filed: Apr. 15, 2020

(65) Prior Publication Data

US 2021/0224173 A1 Jul. 22, 2021

Related U.S. Application Data

(60) Provisional application No. 62/963,802, filed on Jan. 21, 2020.

(51) Int. Cl.
*G06F 11/30* (2006.01)
*G06F 11/07* (2006.01)

(52) U.S. Cl.
CPC ........ *G06F 11/302* (2013.01); *G06F 11/0766* (2013.01); *G06F 11/3006* (2013.01); *G06F 11/3075* (2013.01); *G06F 11/3079* (2013.01)

(58) Field of Classification Search
None
See application file for complete search history.

(56) References Cited

U.S. PATENT DOCUMENTS

| | | | | |
|---|---|---|---|---|
| 8,271,961 B1* | 9/2012 | Chithambaram | ..... | G06F 11/008 717/132 |
| 2002/0116139 A1* | 8/2002 | Przydatek | .............. | G01D 4/004 702/62 |
| 2003/0187967 A1* | 10/2003 | Walsh | ................... | H04L 41/145 714/2 |
| 2007/0010983 A1* | 1/2007 | Bauer | .................. | G06Q 10/109 703/17 |
| 2010/0088281 A1* | 4/2010 | Driesen | ............... | G06F 11/1433 707/E17.007 |
| 2014/0157250 A1* | 6/2014 | Weckwerth | ............... | G06F 8/65 717/170 |
| 2017/0339027 A1* | 11/2017 | Barrett | ................ | H04L 43/0823 |
| 2019/0007278 A1* | 1/2019 | Singh | ................. | H04L 41/0836 |
| 2019/0372884 A1* | 12/2019 | Wackerly | ............... | H04L 49/25 |

* cited by examiner

*Primary Examiner* — Qing Chen
(74) *Attorney, Agent, or Firm* — Pearl Cohen Zedek Latzer Baratz LLP

(57) ABSTRACT

A system and method for determining automated uptime of internet-based software may include one or more memories storing check suites, each check suite including an ordered sequence of a plurality of checks corresponding to an execution flow of an ordered sequence of functions of the internet-based software; and one or more processors configured to determine a total amount of down time for a monitoring period by: during each time interval of the monitoring period, performing each of the plurality of check suites on the internet-based software, and applying at least one weighing factor to results of performing each of the plurality of check suites.

25 Claims, 12 Drawing Sheets

| | Cluster | TimestampNo | Application | DateTime | Location | Result | TestType |
|---|---|---|---|---|---|---|---|
| ☐ | C6 | 1568066710933 | Central | 2019-09-09 22:05:10.933 | Oregon | Up | Login |
| ☐ | C6 | 1568066770796 | Central | 2019-09-09 22:06:10.796 | Oregon | Up | Login |
| ☐ | C6 | 1568066776117 | Central | 2019-09-09 22:06:16.117 | Oregon | Up | Login |
| ☐ | C6 | 1568066830873 | Central | 2019-09-09 22:07:10.873 | Oregon | Up | Login |
| ■ | C6 | 1568066890652 | Central | 2019-09-09 22:08:10.652 | Oregon | Down | Login |
| ■ | C6 | 1568066950831 | Central | 2019-09-09 22:09:10.831 | Oregon | Down | Login |
| ☐ | C6 | 1568067010832 | Central | 2019-09-09 22:10:10.832 | Oregon | Up | Login |
| ☐ | C6 | 1568067071355 | Central | 2019-09-09 22:11:11.355 | Oregon | Up | Login |
| ■ | C6 | 1568067130572 | Central | 2019-09-09 22:12:10.572 | Oregon | Down | Login |
| ☐ | C6 | 1568067191004 | Central | 2019-09-09 22:13:11.004 | Oregon | Up | Login |
| ☐ | C6 | 1568067193389 | Central | 2019-09-09 22:13:13.389 | Oregon | Up | Login |
| ☐ | C6 | 1568067251053 | Central | 2019-09-09 22:14:11.053 | Oregon | Up | Login |
| ☐ | C6 | 1568067311923 | Central | 2019-09-09 22:15:11.923 | Oregon | Up | Login |
| ☐ | C6 | 1568067371066 | Central | 2019-09-09 22:16:11.066 | Oregon | Up | Login |
| ☐ | C6 | 1568067431429 | Central | 2019-09-09 22:17:11.429 | Oregon | Up | Login |
| ☐ | C6 | 1568067491014 | Central | 2019-09-09 22:18:11.014 | Oregon | Up | Login |
| ☐ | C6 | 1568067550780 | Central | 2019-09-09 22:19:10.78 | Oregon | Up | Login |
| ☐ | C6 | 1568067610869 | Central | 2019-09-09 22:20:10.869 | Oregon | Up | Login |
| ■ | C6 | 1568067673543 | Central | 2019-09-09 22:21:13.543 | Oregon | Down | Login |
| ☐ | C6 | 1568067673554 | Central | 2019-09-09 22:21:13.554 | Oregon | Up | Login |

Query: [Table] backup7tests: Cluster, TimestampNo

Fig. 4

| Company | Clusters 10 | Violations 2 | Customers | Downtime Reports | Profile | Log Out |
|---|---|---|---|---|---|---|

C26 99.78%   C30 99.96%

Root Cause Analysis

| Customer | Date | Note | | |
|---|---|---|---|---|
| Ring Central | 2019-10-08 | TBD | - | |
| Atlanta 911 | 2019-10-08 | Outage Reported and Credited ▲ Customer did report this outage and was allotted a credit for the day of the outage. | | 01911927 ▲ |
| SPS Call Center | 2019-10-08 | Customer did not report this outage and therefore is not illegible for a credit. | | 01911927 |

Fig. 6

| Company | Clusters 10 | Violations 2 | Customers | Downtime Reports | Profile | Log Out |
|---|---|---|---|---|---|---|

Customer [Ring Central ▲]　　Customer [Ring Central ▲]　　Cluster C26

| Date ▼ | Status | Suite | Check | Note |
|---|---|---|---|---|
| 2019-10-08 | UP | Critical Path | - | |
| 2019-10-08 | Down | Critical Path | Launch Max | Launch request timed out. |
| 2019-10-08 | Down | Critical Path | Launch Max | Launch request timed out. |
| 2019-10-08 | Down | Critical Path | Launch Max | Launch request timed out. |
| 2019-10-08 | Down | Critical Path | Launch Max | Launch request timed out. |
| 2019-10-08 | Down | Critical Path | Launch Max | Launch request timed out. |

Fig. 7

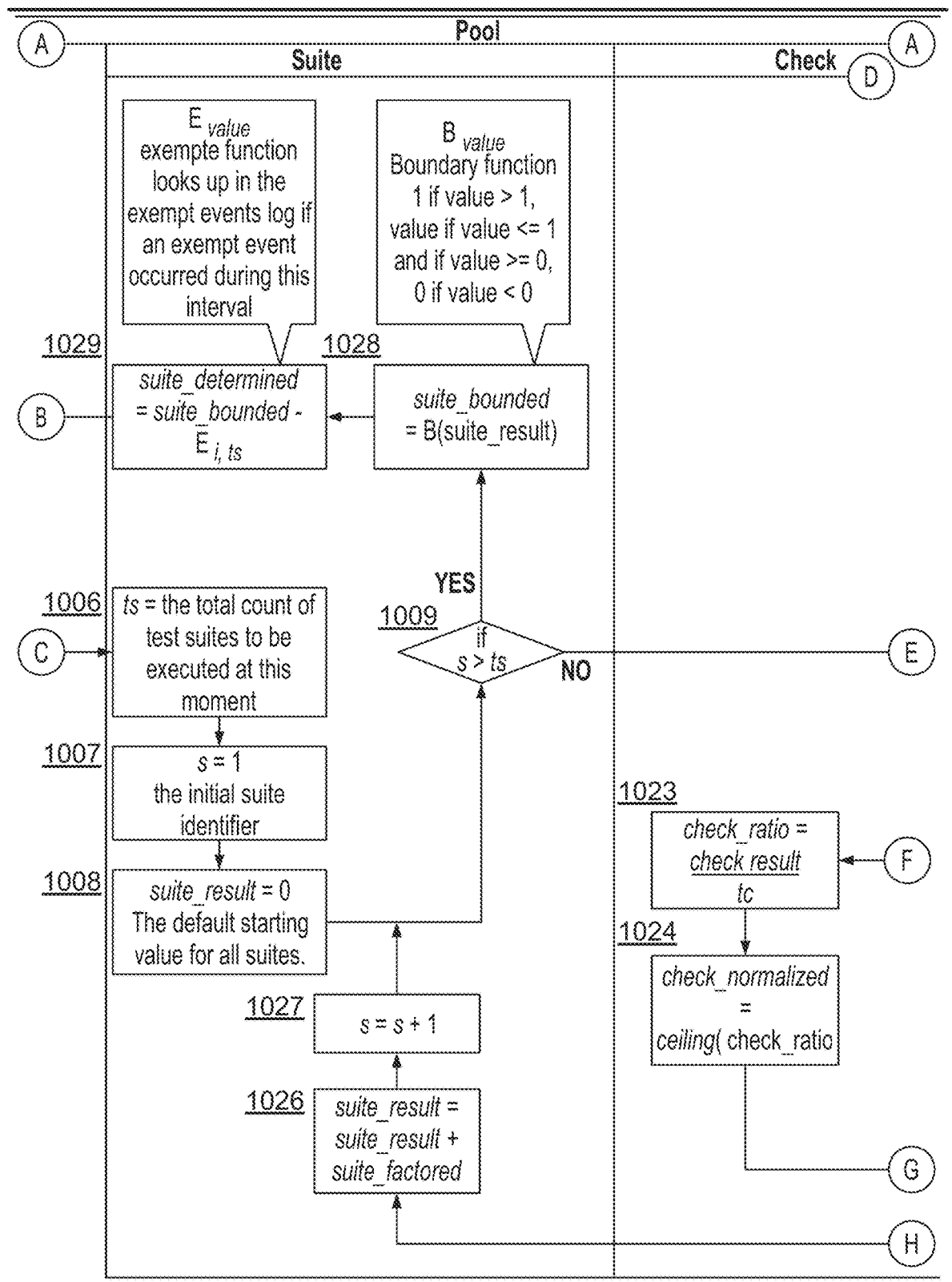
Fig. 10 (cont..)

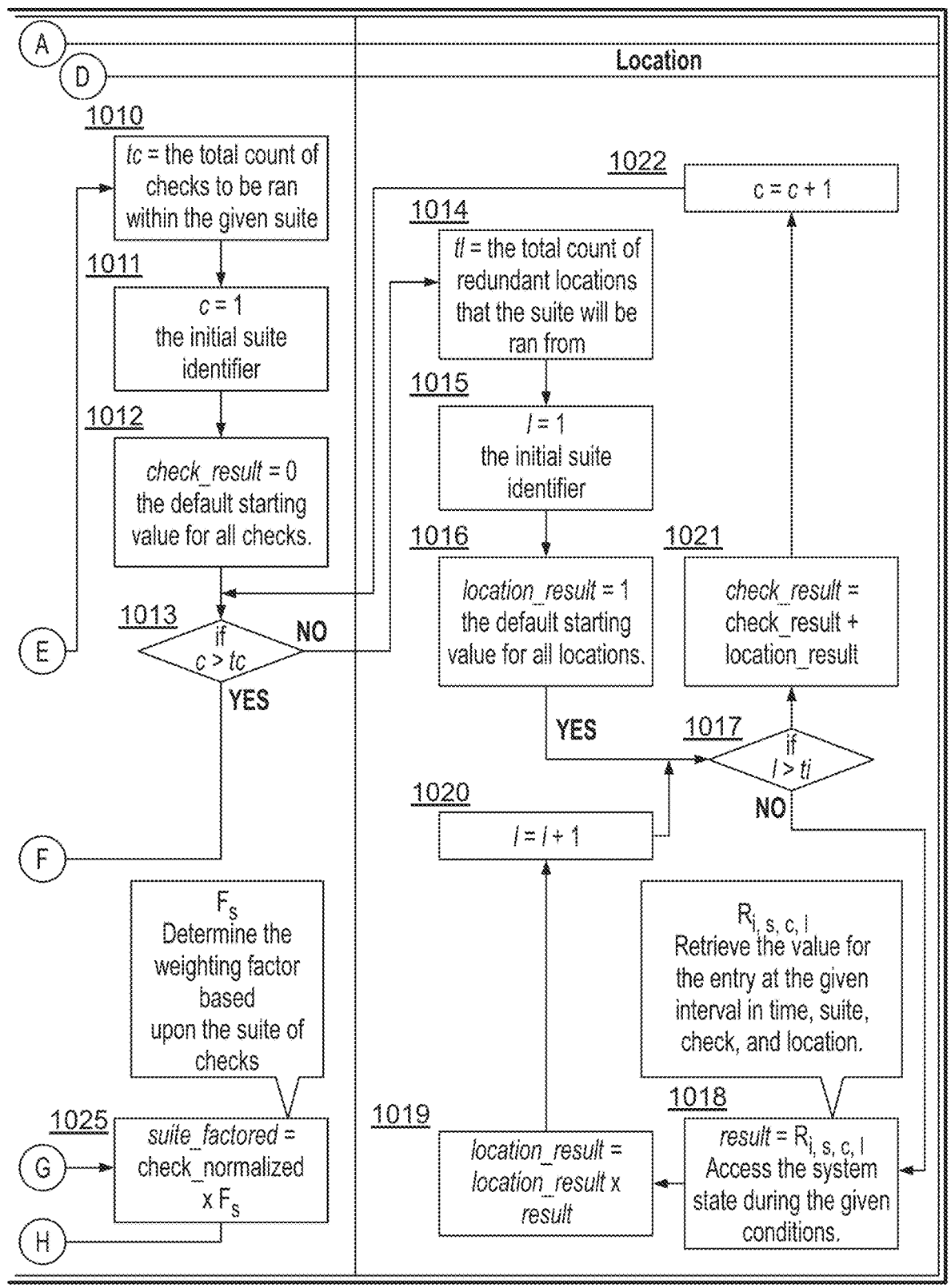
Fig. 10 (cont..)

SYSTEMS AND METHODS FOR AUTOMATED UPTIME MONITORING OF INTERNET-BASED SOFTWARE

CROSS-REFERENCE TO RELATED APPLICATIONS

This application claims priority from U.S. Provisional Patent Application No. 62/963,802, filed Jan. 21, 2020, which is hereby incorporated by reference.

FIELD OF THE INVENTION

Embodiments of the invention relate generally to reliability engineering for internet-based computer systems, such as web services and web applications. In particular, embodiments of the invention relate to automated uptime monitoring of internet-based software operating on computer systems, for example reporting uptime and downtime statistics and identified root causes of the down time.

BACKGROUND OF THE INVENTION

There are numerous commodity implementations of uptime monitoring of distributed computer technology available; almost all perform only a cursory review of the system, such as a web service or web application, being monitored, at best. While the commodity implementations are inexpensive, they cannot meet the scope required to monitor uptime based on the variety of different needs of the system. Current processes for calculating uptime are largely manual and subjective, or implement expensive, incorrect, incomplete, and unverifiable custom solutions, because there is no practical solution that calculates uptime with the required granularity and depth.

A typical prior art system involves a user reviewing application logs or reviewing customer reporting of a service outage to determine downtime.

Monitoring of internet-based software, such as web services and web applications, is complicated. Reliability engineers may combine together monitoring solutions and tweak them to monitor application performance. Reliability engineering is a sub-discipline of systems engineering that emphasizes dependability in the lifecycle management of a product. Once specific case is uptime. Uptime is difficult to track because web services and applications are increasingly complex, with no common interface to monitor them, and there is no specification or standard defining how monitoring uptime should be done properly with consistency from one networked or internet-based technology platform to the next. For example, even if two web services have some functions in common, the criticality of those functions or sequences of those functions may be vastly different for the two web services due to different purposes or targeted users for the web services. Alternatively, certain times of the day or year may be more critical for certain web-based software than others.

Some conventional monitoring services calculate weighted fractional uptimes, which is an uptime where downtime in the past counts less against the availability of the system. Uptime may be expressed as a percentage of the amount of time that a service is available and operational. An example equation to calculate an uptime percentage utilizing weighted fractional downtime may be:

$$uptime \% = \frac{((total-time-downtime) \times weight)}{total-time} \times 100\% \quad \text{EQN. 1}$$

where uptime % is the uptime percentage for a monitoring period, total-time is the total amount of time of the monitoring period, and weight is a weighing factor corresponding to how recent the monitoring period is, such that the more recent the monitoring period is, the higher the weighing factor (weight) is, and, the further in the past the monitoring period is, the lower the weighing factor (weight) is.

One issue with utilizing weighted fractional downtime is that customers may lose fidelity when weighting is applied, for example because weighting may not be explicit or clear to a customer.

Accordingly, there is a need to be able to accurately monitor and report uptime and downtime of web-based software that takes into account differences in needs of various web-based software, and provide detailed reporting of uptime and downtime based on those needs.

SUMMARY OF THE INVENTION

Embodiments of the invention may provide an automated uptime website monitoring application, monitoring applications in distributed technology systems and producing data, for example, available for internal report generation or to external users via a web interface or web service. Embodiments of the invention may be implemented as for example software in an automated uptime website monitoring application.

A system and method for automated uptime of networked or internet-based software may include one or more memories storing check suites, each check suite including an ordered sequence of a plurality of checks corresponding to an execution flow of an ordered sequence of functions of the internet-based software; and one or more processors configured to determine a total amount of down time for a monitoring period by: during each time interval of the monitoring period, performing each of the plurality of check suites on the internet-based software, and applying at least one weighing factor to results of performing each of the plurality of check suites.

Embodiments of the invention may improve distributed technology and solve prior art issues by, for example, allowing for monitoring of distributed technology that is accurate, and by standardizing uptime and downtime calculations in a model that represents how data should be captured and tracked and how it should be reported.

BRIEF DESCRIPTION OF THE DRAWINGS

Dimensions of features shown in the figures are chosen for convenience and clarity of presentation and are not necessarily shown to scale. The invention, both as to organization and method of operation, together with objects, features and advantages thereof, can be understood by reference to the following detailed description when read with the accompanied non-limiting drawings. Embodiments of the invention are illustrated by way of example and not limitation in the figures of the accompanying drawings, in which like reference numerals indicate corresponding, analogous or similar elements.

FIG. 4 is an exemplary screenshot of a graphical user interface for viewing the results of check suites performed, according to embodiments of the present invention.

FIG. 6 is an exemplary screenshot of a graphical user interface for viewing violations of an SLA, according to embodiments of the present invention.

FIG. 7 is an exemplary screenshot of a graphical user interface for viewing the status of checks performed for a customer, according to embodiments of the present invention.

Figure 1:
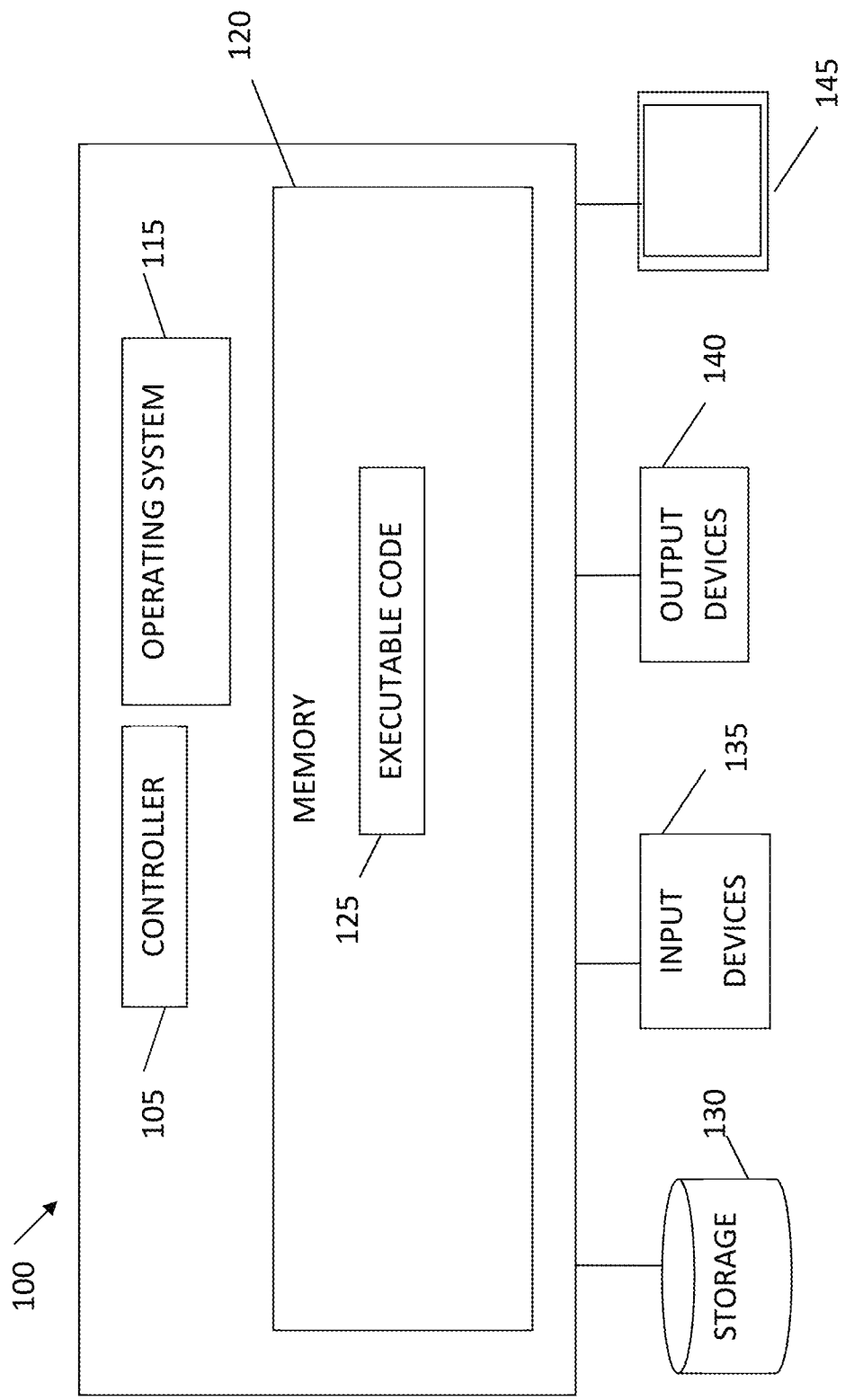
FIG. 1 is a block diagram of a computing device used with or executing embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention pertain to the technology for reliability engineering for networked or internet-based software, such as automated uptime monitoring of web services and web applications, and may provide an improvement to this technology by, for example, automatically determining uptime and downtime with improved accuracy and based on the needs of the internet-based software, and providing root causes of the downtime. For example, embodiments of the invention may be utilized for determining uptime and downtime of internet-based software (e.g. a target system, subsystem, or module) in order to determine an amount of compliance of a service provider in a service-level agreement ("SLA") for internet-based software operating on distributed technology, such as a web service or web application. An SLA for a particular internet-based software system may require that the service provider provide a credit of some kind to the client if at least a minimum amount of uptime for the internet-based software is achieved.

An SLA may be an agreement between a service provider, such as a provider of a web service or web application, to a client to utilize to conduct at least a portion of their business. For example, a service provider may be a provider of a call center web service that a client can utilize to conduct, for example, customer service or sales calls. The SLA may set forth requirements, such as an amount of uptime for internet-based software, and the SLA may define payment by the client for the service to be determined based on an amount of uptime for the internet-based software. Thus, it may be necessary to determine the amount of uptime for the internet-based software.

Uptime may mean the amount of time that a service, software package, or technology system (including distributed software or technology), such as an internet-based software, is available and operational according to some typically pre-defined standard or definition. For example, uptime may be expressed as a percentage or fraction of time an internet-based software system has been working and available. An uptime percentage may also be referred to as availability, which may be a probability that the internet-based software is operating at a specific time. Uptime percentages may be expressed as an amount of "nines." Numbers very close to, but below one (1.0) may be expressed in "nines", the number of nines following the decimal separator in writing the number in question.

For example, the following example uptime percentage may signify following downtimes per year.

| Uptime percentage | Nines | Downtime per year |
| --- | --- | --- |
| 90% | 1 nine | 876 hours |
| 95% | 1 nine and 5 | 438 hours |
| 99% | 2 nines | 87 hours 36 minutes |
| 99.9% | 3 nines | 8 hours 45 minutes |
| 99.99% | 4 nines | 52 minutes |
| 99.999% | 5 nines | 5 minutes |

A year may have 8,760 hours, therefore if the uptime percentage is 90%, then the amount of downtime per year is 876 hours (10%×8760 hours). Other manners of expressing uptime or percentages may be used. A measure of uptime may include, for each different system, a measure or weighting related to its importance or criticality.

Downtime (e.g. when a system is "down") may mean the amount of time that the service, software or technology is not available or not operational. Downtime may be expressed or measured as the opposite of uptime (e.g. when a system is "up"), or expressed as the percentage or fraction where the system does not have uptime. However, due to the growing complexity and differences between various internet-based software services, there are no fixed, or accurate or useful, definitions or rules that a computer may utilize to automatically and accurately determine whether internet-based software is up (e.g., available and operational). Even if two services have some functions in common, the criticality of those functions or sequences of those functions may be vastly different for the two web services due to different purposes or targeted users for the web services. A feature not working for one client's web service may drastically affect a client's ability to utilize the web service for business, whereas that same or similar feature not working for another similar web service for a different client may either not affect that client's ability to utilize the web service to perform business, or only marginally affect that client's ability to utilize the web service to perform business.

For example, a newly set up call center may not be able to operate in its entirety (viewed through the definition of usefulness to a client) if a sub-component in its software is not able to start entering employees into the system so that they may be eventually assigned the ability to take calls (e.g. telephone calls), or may be severely affected by not being able to enter new employees into the system if they do not currently have enough employees in the system that can assigned calls. In contrast, for an already set up call center that already has plenty of employees entered into the system, not being able to enter new employees into the system would not affect business as much if the employees already entered into the system can still take calls. Thus, the same technology platform may have a different definition of uptime and downtime based on its state or current use scenario, this being factored into criticality of sub-components.

Because different clients have different needs, and different internet-based software have different purposes and features, embodiments of the invention may utilize weighing factors (e.g. criticality based factors) to calculate uptime based on the needs of the customer. Different features or sub-components may be given different weighing factors so that critical features are given a higher weight than important but not critical features, and important but not critical features are given a higher weight than ancillary features, so that failure of less critical features effect uptime calculations less than failure of more critical features. Additionally or alternatively, failures of features during different periods of time may have different weighing factors such that critical periods of time for the client effect uptime more than less critical periods of time, and so that certain exempt periods of time may not affect the uptime calculations at all.

For an internet-based software, such as a web service or web application, the client may define, in the SLA, a plurality of features that are important for their business, such as registering new employees in the system, transferring calls to registered employees, scheduling registered employees for training, etc., which are required to be up.

Embodiments of the invention may improve the accuracy of determining uptime and downtime for internet-based software, by, for each time interval of a monitoring period, for each of a plurality of features (e.g. features under test) of the internet-based software, performing an ordered sequence of checks on an execution flow of functions necessary to perform the feature. A check may be a single action executed in the internet-based software being tested. A check may be a test run against an internet-based software, such as a single action taken against an internet-based software to determine whether the system is up and available.

An interval may be a time period that reflects a number of times the ordered sequence of checks is performed on internet-based software within a larger period or window of time, such as a monitoring period. For example, an interval having a granularity of 5 minutes for a time window of an hour means the check-suites were triggered every 12 minutes. A monitoring period may be a range of time, such as a month, that an internet-based software is monitored, for example, to generate a monthly uptime report.

The plurality of check suites for an internet-based software, such as a web service or web application, for a client may be stored in a database. Each of the plurality of check suites may correspond to a different feature of internet-based software that is important for the client (e.g., features under test defined in SLA for calculating uptime). Each check suite may have an associated weighing factor that is based on the criticality of the feature the check suite is designed to test. Embodiments of the invention may further increase the accuracy of determining uptime and downtime by calculating downtime by utilizing a suite-based weighing factor based on the criticality of the feature of the internet-based software corresponding to the check suit. A check suite when used herein may refer to: the set of evaluations as described herein; the software or code that perform such evaluations; and instances or processes of such software or code when executing on one or more processors (e.g. as shown in FIG. 1). Thus, when discussed herein, a check suite operating, being applied or being performed may refer to an automatic or automated process, where a processor executes or applies a check suite in order to evaluate a different instance of software executing typically (but not necessarily) on a different processor. For example, a check suite may be executed by processor A located in location A', that instance of a check suite interacting with a remote software package executed by processor B located in location B'.

For example, if a feature or sub-component is critical, the suite-based weighing factor for its corresponding check suite may be 1. If a feature or sub-component is not critical but necessary for utilizing a given internet-based software, the weighing factor for its corresponding check suite may be less than 1 and above 0. For example, a check suite for a critical feature may have a suite-based weighing factor of 1, a check suite for a necessary but not critical feature may have a suite-based weighing factor of 0.7, and an ancillary feature or sub-component may have a weighing factor of 0.2. The level of criticality may be determined by the necessity of the feature for the customer to use the features under test to conduct business. For example, in the call center industry it is important and critical to route phone calls to agents. It is not critical but it is necessary to be able to add new employees as agents. Some businesses may differ from these examples of critical and necessary. For example, some customers may have high attrition and need the ability to add new agents so the number of agents capable of accepting calls is high enough to continue to conduct business.

Each of the plurality of check suites may include an ordered sequence of a plurality of checks, and each check may correspond to a function in an execution flow of functions necessary to perform the corresponding feature of the check suite.

For example, a web service of a call center may have a critical feature, such as an employee taking calls, which requires an execution flow of an ordered sequence of functions. For example, in order for an employee to take calls, the following functions may all need to be able to be performed: (1) logging into the call center web service, or call center client (a call center client may be a module connecting a call to an agent and possibly performing other functions such as delivering other media such as emails, chats, etc.) (2) assigning a type of call (e.g., service or sales) the employee is to receive, and (3) setting the employee's status to available so that the employee starts receiving the assigned type of calls. If any of the above exemplary functions fails during a given time interval, the employee may not be able to receive calls. An example check suite for testing an employee's ability to take calls may be performing the following example ordered sequence of checks: (1) logging into the call center web service, (2) assigning a type of call (e.g., service or sales) the employee is to receive, (3) launching the call center client, (4) setting the employee's status to available so that the employee starts receiving the assigned type of calls, (5) making an outbound call that must be answered by an answering machine, (6) recording a message on that answering machine, (7) confirming the recording was captured, and (8) receiving an inbound call from another piece of automation.

A check suite may be an automated process that performs a function, sub-system or sub-function of a system being evaluated for uptime, possibly using fake or "test" data such as a reserved account on the system under test with phone numbers assigned for monitoring. Such a check suite process may be executed by a processor to be applied to target software, to act as a human user or other user (e.g. another process interfacing with the tested system may be a user). The check suite may execute on a processor and return whether or not the function or sub-function operates successfully. Each check suite of internet-based software may be performed during each time interval during a monitoring period. If at least one check of or within a check suite fails, the feature or sub-system corresponding to that check suite may be determined to have failed, and an indication of downtime may be recorded for that check suite for that time interval. The indication of downtime may be any alpha or numeric identifier such as a 1 or "DOWN".

Performance of a check suite may be stopped in response to a check of the check suite on a function failing because if a single function of the sequence of functions being checked does not work, the corresponding feature or sub-system of the internet-based software will not work, and thus, there is no need to check whether checks in the check suite subsequent to the failed check in the check suite work. In other words, if at least one check of a check suite fails, embodiments of the invention may determine that the entire check suite failed.

For example, if an internet-based software has a first check suit, which involves 10 checks, for a first feature, and, in a given time interval, the first check works but the second check fails, embodiments of the invention may record an indication of downtime in a database for that first feature for that time interval, not perform the third through tenth checks of that check suite, and then start performing a second check suite for a second feature of the internet-based software.

If no checks in a check suite fail, then an indication of uptime may be recorded for that check suite for that time interval. The indication of uptime may be any alpha or numeric identifier such as a 0 or "UP".

Embodiments of the invention may improve existing systems and allow for automatic, standardized, quick and efficient determination of which check of a check suite failed during a time interval by, for each check suite that failed during the time interval, determining a check ratio for the check suite for that time interval. For a check suite that failed, a check ratio may be determined by dividing the amount of checks of the check suite performed by the amount of total checks in the check suite, as in the following example equation:

$$CR = \frac{c_P}{c_T} \qquad \text{EQN. 2}$$

where CR is the check ratio for a check suite that failed, $C_P$ is the amount of checks in the check suite performed, and $C_T$ is the total amount of checks in the check suite. Such a result may be used to provide detail to a user (e.g. for a drill down report) and to allow multiple fails to be captured or detected, while preventing more than one error from being acknowledged. In some cases, if a check fails all subsequent checks will fail too. In some embodiments, a fail prevents further tests from taking place, e.g. a failed test cuts off subsequent tests.

For example, if a check suite has 4 checks and the first check failed, then the check ratio would be $$0.25\left(\frac{1}{4}\right)$$

because the other three checks were not performed. If the check suite has 4 checks, and the fourth check failed, then the check ratio would be $$1\left(\frac{4}{4}\right)$$

because each of the four checks were performed.

Each check ratio may be stored in the database. To determine which check of a check suite failed, embodiments of the invention may multiply the check ratio for a failed check suite by the total amount of checks in the check suite (this result also may be stored), as in the following example equation:

$$C_P = CR \times C_T \qquad \text{EQN. 3}$$

For example, if the check ratio of a failed check suite was 0.5 and the total amount of checks in the check suite was 4, then embodiments of the invention can determine that only half (0.5) of the total amount of checks (4) in the check suite were performed, which means that the check suite stopped being performed after only 2 (0.5×4) of the checks were performed because the second check failed.

In some embodiments of the invention, the accuracy of determining uptime and downtime may be further improved by, for each time interval in a monitoring period, performing each check suite for an internet-based software, such as a web service or web application, on a plurality of processors located in different geolocations, to factor out regional issues which are unrelated to the requirements of the service provider under its SLA for a client's internet-based software.

For example, a processor may be located at each of four different locations, such as Oregon; Northern Virginia (in the US); Sydney, Australia; and Frankfurt. In some embodiments, locations are to be far enough apart so that a natural and human caused disaster has an extremely low chance of impact on more than one location. Each processor may perform the exact same check suites on the same internet-based software at geographically different locations or sites. If a check suite does not fail for each of the processors or systems located in different geolocations, then the failure may be caused by regional connectivity issues which are unrelated to the requirements of the service provider under the SLA. However, if the same check suite fails for each of the processors located in different geolocations, then the failure may not have been caused by a regional connectivity issue and may instead have been caused due to an issue that the service provider is required to ensure does not happen under the SLA. Thus, in some embodiments of the invention, an indication of downtime of a check suite for a given time interval may only be recorded if each of the check suite failed for each and every of the processors in different geolocations during that time interval.

For example, during each time interval in a monitoring period, a plurality of processors, where at least two of the processors are located in different geolocations, may automatically perform the same plurality of check suites on an internet-based software system. For each of the plurality of check suites performed in an interval, each processor may, in response to a check failing, not perform any checks subsequent to the failed check in the ordered sequence of the check suite, and record an indication of failure, for example 1, in a database, for that check suite for that interval. If each check in a check suite is successful, the processor may record an indication of success, for example 0, in the database, for that check suite for that interval.

For each time interval, one or more of the plurality of processors may record an indication of downtime, for example 1, in the database, for a check suite, if each of the plurality of processors located in different geolocations recorded an indication of failure, for that check suite for that time interval in the database. For each time interval, an indication of uptime, for example 0, may be recorded, in the database, for a check suite, if each of the plurality of processors located in different geolocations recorded an indication of success for that check suite for that time interval.

In some embodiments of the invention, the accuracy of determining uptime and downtime may be further improved by employing false fail avoidance, by tweaking or adjusting time outs and repetition checks. Packet loss and bad or slow routing may cause the internet or another network used to run slower than usual. There may be a need to factor out such internet connectivity problems which may be unrelated to the requirements of the service provider under the SLA.

For example, when a browser attempts to access internet-based software that is not accessible, the browser or automated check system may wait for a very short predetermined period of time, and if it does not receive a handshake signal identifying success before the end of the predetermined period of time, then the it will return an error, which indicates downtime. The predetermined period of time that a browser or automated check system is configured to wait before assuming a check fails is called a time out period.

Thus, a check may be treated as a fail if the result of the check (e.g., receive a status code indicating success or failure) is not received before the check is performed for more than the time out period. If the time out period is five seconds, and the check cannot perform/complete a certain function within the five seconds, then the check is considered a fail even if the check would have been successful if the check was allowed to be performed for seven second (e.g., the check would have succeeded on the seventh second).

Accordingly, embodiments of the invention may utilize a shorter time out period for clients with fast/good internet connectivity and utilize a longer time out period for clients with slow/bad internet connectivity. This may factor out issues with client's internet connectivity issues which are irrelevant to the service providers requirements under the SLA. For example, a client with good internet connectivity may have a time out period of 5 seconds whereas a client with bad internet connectivity may have a time out period of 10 seconds so that embodiments of the invention do not spend too much time trying to wait for the results of a check but also so that a slow internet connectivity does not result in false indications of down time.

In some embodiments of the invention, internet connectivity problems may be factored out by, in a time interval, performing multiple attempts at performing the check when a check fails, and only counting that check failure as downtime if each of the multiple attempts at performing that check failed during the time interval. For example, if a check fails during a time interval, embodiments of the invention may retry the check up to two more times during that time interval, and if the check is successful in at least one of the two additional performances, then the check may be considered successful for that time interval. However, if the check fails each of the three times during the time interval, then the check may be considered a failure for that time interval, and consequently the check suite of that check may be considered a failure for that time interval.

For example, during each time interval in a monitoring period, a plurality of processors, where at least two of the processors are located in different geolocations, may automatically perform the same plurality of check suites on an internet-based software. For each of the plurality of check suites performed in an interval, each processor may, in response to at least one of the checks returning a response that the check failed, not perform any checks subsequent to the failed check in the ordered sequence of the check suite, and record an indication of failure, for example 1, in a database, for that check suite for that interval. If each check in a check suite returns a response that the check succeeded, the processor may record an indication of success, for example 0, in the database, for that check suite for that interval.

For each check performed, if any check does not return a response within a predetermined amount of time, the processor performing the check may retry the check up to a predetermined amount of times more, for example two more times, during the time interval. If no response is received from one of the retries, the processor may record, in the database, an indication of failure in the database for the check suite of the check for that time interval.

The predetermined amount of time to wait for a response and/or the predetermined amount of times to retry a check that failed may differ depending on the client. For example, a first predetermined amount of times of two retry attempts and a predetermined amount of time to wait of 5 seconds may be utilized for a first client, and a second predetermined amount of times of one retry attempt and a predetermined amount of time to wait of 3 seconds may be utilized for a second client depending, for example, on the speed and reliability of the first and second clients.

After performing each check suite on the internet-based software in each interval of a monitoring period, the one or more processors may access the results of the check suites for that monitoring period and calculate downtime for the internet-based software for that monitoring period. For each time interval in a monitoring period having at least one indication of downtime, the one or more processors may calculate a suite-based weighted downtime for the time interval by multiplying the total amount of time of the time interval by the sum of each suite-based weighing factor of each check suite that corresponds to one of the at least one indication of downtime, as in the following example equation:

$$SWDT = t(I) \times \Sigma_{i=1}^{n} SW_i \qquad \text{EQN. 4}$$

where SWDT is the suite-based weighted downtime for the time interval, t(I) is the total amount of time of the time interval, $\Sigma_{i=1}^{n} SW_i$ is sum of each suite-based weighing factor of each check suite that corresponds to an indication of downtime.

For example, a first indication of downtime may have been stored for a first suite check that failed during a time interval and a second indication of downtime may have been stored for a second suite check that failed during the time interval. If the total amount of time t(I) of the time interval was 10 seconds, the first suite-based weighing factor $SW_1$ corresponding to the first suite check is 0.5, and the second suite-based weighing factor $SW_2$ is 0.2, then the suite-based weighted downtime (SWDT) for the time interval may be 7 seconds (10 s×(0.5+0.2)).

The suite-based weighted downtime (SWDT) for a time interval may be capped so that it does not exceed the total amount of time of the time interval (t(I)). For example, if there are two indications of downtime for a 10 second (t(I))

time interval, the first indication of downtime is for a first failed suite check having a first suite-based weighing factor $SW_1$ of 0.2, and a second indication of downtime for a second failed suite check having a second suite based weighing factor suite-based weighing factor $SW_2$ of 1, the suite-based weighted downtime (SWDT) for the time interval may be 10 seconds.

The total amount of downtime ($DT_{total}$) for a monitoring period may be calculated by summing each of the suite-based weighted downtimes (SWDT) for each time interval in the monitoring period having at least one indication of downtime.

Some embodiments of the invention further increase the accuracy of determining uptime and downtime by utilizing a time-based weighing factors corresponding to different time periods, such as a time range and/or a date range.

For example, embodiments of the invention may utilize exempt time periods where if a check suite fails during that exempt time period, the failure of the check suite is recorded but that failure is weighted to zero and thus not included in the calculation of downtime. An example of an exempt time period may be a period where the service provider and client do not expect the internet-based software to run properly, such as during hours of scheduled maintenance or during ours when the client does not utilize the internet-based software, such as outside of work hours (e.g., 12 midnight to 3:00 A.M.). Because the internet-based software may not be expected to be operable or even accessed or used by anyone during certain hours, any failure of a check suite should not be counted towards downtime. Maintenance may include function tests or checks (e.g. making sure that the maintenance did not damage the system), servicing, repairing, or replacing of necessary devices, equipment, machinery, building infrastructure, or support utilities in industrial, business, governmental, and residential installations.

Additionally, certain times of the day or times of the year may be more critical to the client's business than other days or times of the year and may have a higher weighing factor applied than other times of the year. For example, if the client's internet-based software is mostly used during the summer, then the summer months may receive a weighing factor of 1 and all other months may receive a weighing factor of less than 1 (e.g., 0.2).

Where a time interval occurs in more than one overlapping time period, a total time-based weighing factor ($TWF_{total}$) for a failed check-suite for that time interval may be calculated for the time interval by, for example, by multiplying each time-based weighing factor for each of those overlapping time periods.

For example, if June through August has a time-based weighing factor of 1, September through May has a time-based weighing factor of 0.5, midnight to 3:00 A.M. has a time-based weighing factor of 0.2, 3:01 A.M. to 11:59 P.M. has a time-based weighing factor of 1, and 1:00 A.M. to 2:00 A.M. on Jul. 4, 2019 has a time-based weighing factor of 0, then, if a check-suite failed during a time interval of 1:00 P.M. to 1:10 P.M. on Sep. 1, 2019, then the total time-based weighing factor ($TWF_{total}$) for the failed check suite may be 0.5 ($0.5_{September-May} \times 1_{3:01\ A.M.-11:59\ P.M.}$). If the check-suite failed during a time interval of 1:30 A.M. to 1:40 A.M. on Jul. 4, 2019, then the total time-based weighing factor ($TWF_{total}$) for the time interval may be 0 ($1_{June-July} \times 0.2_{midnight\ to\ 3:00\ A.M.} \times 0_{1:00\ A.M.-2:00\ A.M.\ on\ Jul.\ 4,\ 2019}$).

A time-based weighted downtime for a time interval may be calculated, as in the following example equation:

$$TWDT = t(I) \times TW_{total} \qquad \text{EQN. 5}$$

where TWDT is the time-based weighted downtime for the time interval, t(I) is the total amount of time of the time interval, and $TW_{total}$ is the total time-based weighing factor which is the product of each time-based weighing factor corresponding to the when the time interval occurred.

For example, if a time period of 12 midnight to 3:00 A.M has a total time-based weighing factor ($TW_{total}$) of 0.5 and one or more check suites fail during a time interval of 10 seconds (t(I)) falling within a time period 12 midnight to 3:00 A.M, then the time-based weighted downtime (TWDT) for the time interval may be 5 seconds ($10s_{t(I)} \times 0.5_{TW_{total}}$).

In some embodiments of the invention, one or more memories may store a list of exempt time periods, for example, time periods having a time-based weighing factor (TWF) that is 0. For each time interval in a monitoring period having at least one indication of downtime recorded, if the time interval occurred within any of the time periods in the list of exempt time periods, no further determinations or calculations may be performed, the total weighted downtime ($WDT_{total}$) for that time interval may be set at 0, and the time of that time interval may be stored in a list of exempt downtimes. For each time interval in the monitoring period having at least one indication of downtime recorded, if the time interval did not occur within any of the time periods in the list of exempt time periods, the one or more processors may determine a suite-based weighted downtime (SWDT) for the time interval according to EQN. 4 or determine a time-based weighted downtime (TWDT) for the time interval according to EQN. 5.

Both suite-based weighing factors and time-based weighing factors may be utilized to calculate a weighted downtime for a time interval. For example, for each time interval in a monitoring period having at least one indication of downtime recorded, a suite-based weighted downtime (SWDT) for the time interval may be calculated according to, for example, EQN. 4. The suite-based weighted downtime (SWDT) for the time interval may be capped so that it may not be greater than the total amount of time t(I) of the time interval. For each time interval having a suite-based weighted downtime (SWDT), a total weighted downtime (WDT) may be calculated by multiplying the suite-based weighted downtime (SWDT) for the time interval by the product of each time-based weighing factor ($TW_{total}$) corresponding to the time interval, as in the following example equation:

$$WDT = SWDT \times TW_{total} \qquad \text{EQN. 6}$$

where WDT is the total weighted downtime for the time interval, SWDT is the suite-based weighted downtime for the time interval is the total amount of time of the time interval, and $TW_{total}$ is the total time-based weighing factor which is the product of each time-based weighing factor corresponding to the when the time interval occurred.

For example, if a first check suite having a first suite-based weighing factor ($SW_1$) of 0.2, and a second check suite, having a second suite-based weighing factors of 0.5, each have an indication of downtime stored for a 10 minute (t(I)) time interval, then the suite-based weighted downtime (SWDT) for that time interval, according to EQN. 4, may be 7 minutes (10 minutes$\times$(0.2+0.5)). If that time interval occurred at Jun. 20, 2019 at 2:00 AM to 2:10 A.M., a first period of time of June through August has a first time-based weighing factor ($TW_1$) of 1 and a second period of time of midnight to 3:00 A.M. every day has a second time-based weighing factor ($TW_1$) of 0.5, then the total weighted downtime (WDT) for the time interval may be 3.5 minutes (7 minutes$\times$(1$\times$0.5)).

Alternatively, for each time interval in a monitoring period having at least one indication of downtime recorded, a time-based weighted downtime (TWDT) for the time interval may be calculated according to, for example, EQN. 5. For each time interval having a time-based weighted downtime (TWDT), a total weighted downtime (WDT) may be calculated by multiplying the time-based weighted downtime (TWDT) for the time interval by the sum of each suite-based weighing factor of each check suite that failed during that time interval, as in the following example equation:

$$WDT = TWDT \times \Sigma_{i=1}^{n} SW_i \qquad \text{EQN. 7}$$

where WDT is the total weighted downtime for the time interval, TWDT is the time-based weighted downtime for the time interval is the total amount of time of the time interval, and $\Sigma_{i=1}^{n} SW_i$ is sum of each suite-based weighing factor of each check suite that failed during that time interval.

The total weighted downtime (WDT) for the time interval may be capped or limited so that it may not be greater than the time-based weighted downtime (TWDT) of the time interval.

The total amount of downtime ($DT_{total}$) for a monitoring period may be calculated by summing each of the total weighted downtimes (WDT) for each time interval in the monitoring period having at least one indication of downtime.

The total amount of uptime ($UT_{total}$) for the monitoring period may be calculated by subtracting the total amount of downtime for the monitoring period from the total amount of time of the monitoring period, in the following example equation:

$$UT_{total} = t(m) - DT_{total} \qquad \text{EQN. 8}$$

where $UT_{total}$ is the total amount of uptime for the monitoring period, t(m) is the total amount of time of the monitoring period, and $DT_{total}$ is the total amount of downtime for the monitoring period.

An uptime percentage (uptime %) may be calculated for a monitoring period by dividing the total amount of uptime $UT_{total}$ for the monitoring period by the total amount of time, t(m) of the monitoring period, and multiplying that by 100%, as in the following example equation:

$$uptime\ \% = \frac{UT_{total}}{t(m)} \times 100\%$$

The uptime percentage (uptime %) of each monitoring period for the client may be utilized to calculate credit due to the customer under the client's SLA.

Reference is made to FIG. 1, which is a block diagram of a computing device (100) used with or executing embodiments of the present invention. Computing device 100 may include a controller 105 that may be, for example, a central processing unit processor (CPU) or any other suitable multipurpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. A computing device 100 or controller 105 (e.g. executing executable code 125) may act as a computer system or software package whose uptime or downtime is being measured, or perform or act as a check or check suite, calculate uptime and downtime based on the results of the check suites, or perform other functions, Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to operate a computer system or software package whose uptime or downtime is being measured, or perform or act as a check or check suite, or perform other functions, as discussed herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as check suite data, data used to operate systems under evaluation, etc. may be stored in storage system 130 and may be loaded from storage system 130 into memory 120 where it may be processed by controller 105. Some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Figure 2:
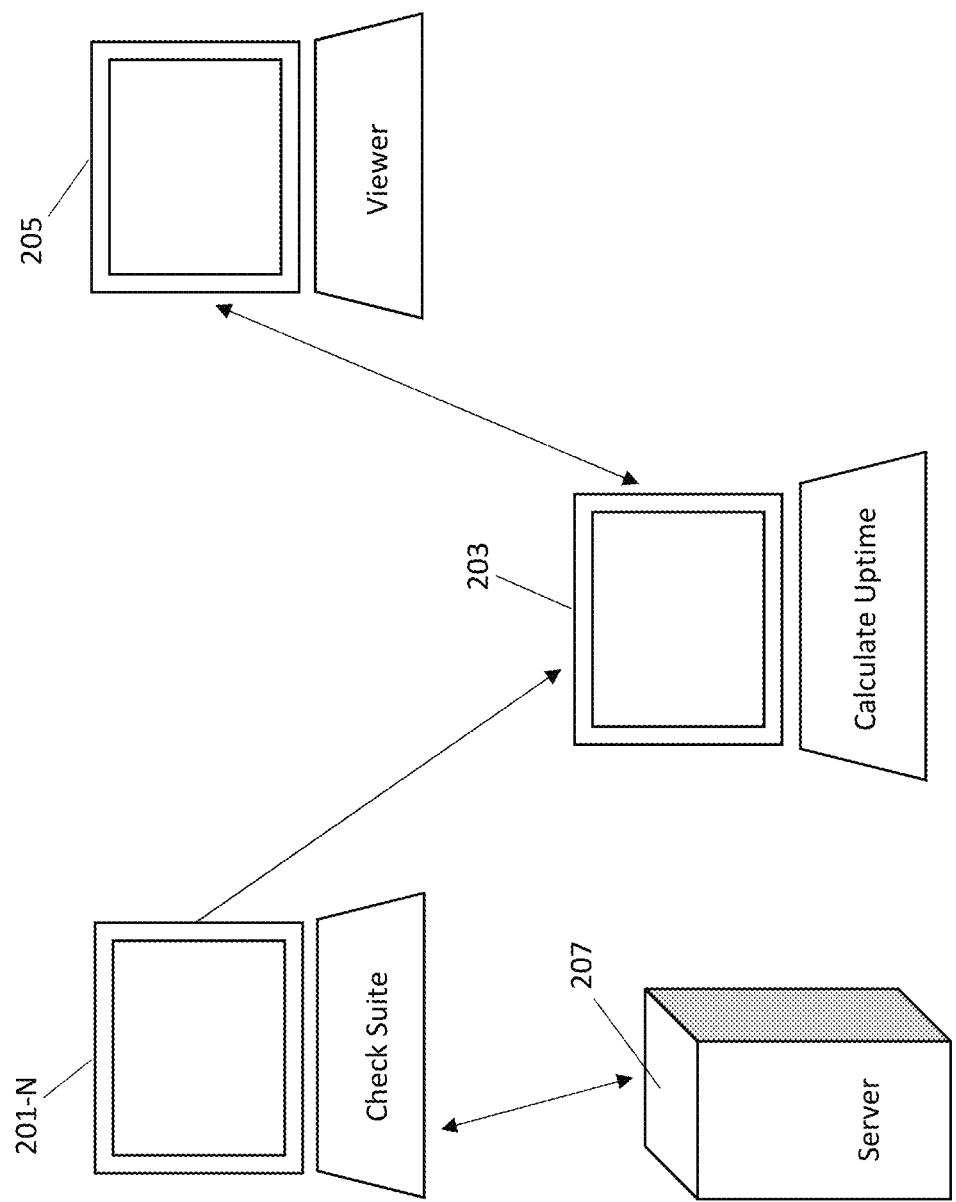
FIG. 2 is an exemplary system for monitoring uptime of internet-based software, according to embodiments of the present invention.

Reference is made to FIG. 2, which is an exemplary system for monitoring uptime of internet-based software, according to embodiments of the present invention.

The system may include at least one server 207, which may execute or host internet-based or other software to be monitored, for example software that customer computing devices can remotely use or log into. In other embodiments other devices or system may host or execute software to be monitored. A plurality of computing devices $201_{1-N}$ (e.g., a plurality of devices such as the computing device 100 of FIG. 1), each located in a different geolocation, may execute checks or check suites and may for example simulate customer computing devices or other systems that interact with software being monitored, for example by remotely logging into or accessing the plurality of servers 207 to use the internet-based software, and for performing check suites on the internet-based software provided to the customers. The system may also include a computing device 203 for calculating uptime and downtime based on the results of the check suites, and at least one computing device 205 which is configured to be able to view the uptime and downtime calculated. While computing devices $201_{1-N}$ are shown as separate systems, they may be combined, and further various functionalities described herein are shown as operating on certain computers, but may operate on other combinations of systems in some embodiments. In some embodiments certain functionality, e.g. a monitoring system gathering data and calculating uptime and downtime (e.g. computing device 203 for calculating uptime and downtime, or monitored software executed on the at least one server 207), may be executed on a third-party or cloud service such as the Amazon Web Service platform ("AWS"), typically using software or modules developed by an institution such as NICE inContact. Such functionality need not be executed by a cloud platform. Processes executed on a server 207 which are being monitored may be located in various locations, e.g. in data centers controlled by NICE inContact or another organization, as part of services provided by a cloud platform such as AWS, etc. A computing device 203 for monitoring and for calculating uptime and downtime may be, for example, hosted in a cloud service such as AWS and may use cloud (e.g. AWS) geolocation features to host the monitoring software in multiple locations (e.g. Oregon; Virginia; Frankfurt, Germany; and Australia) but may be executed or exist in other locations. In other embodiments, the at least one server 207 may also perform a monitoring service and calculate uptime and downtime.

Various processors are described herein. Embodiments of the invention may be carried out by one or more processors (e.g. embodied in the at least one server 207, devices $201_{1-N}$, or computing device 103) in combination or separately. For example, one single processor may execute target internet-based software, execute checks, apply weighing factor(s) and determine uptime. In another example, one processor may execute target internet-based software, another processor may execute checks, and another processor may apply weighing factor(s) and determining uptime. The same processor may both execute checks and apply weighing factor(s) and determine uptime. Other combinations may occur.

While in some embodiments, an end user may drill down or expand data items displayed in a report; in other embodiments one or more reports may be displayed that condense the data instead of showing the viewer a line by line report. For example, an outage might have lasted for one hour and, if it is being monitored in four locations, this may result in for example 240 lines or entries in a database representing that outage. A corresponding down time report may only include a start time, stop time, and the details about the affected part(s) of their application.

Different computers or processes (e.g. a process executed on a cloud server) may perform the relevant checks. For example, software may be executed in each location that runs checks, on application being monitored and executed at that location, by the system executing the application. This may be desirable in that geolocation-based redundancy results in a more stable system which is protected from most natural disasters or localized service interruptions. In addition, a monitoring system may factor in elements not under control of entity maintaining the system under test (e.g. the relevant ISP (internet service provider)). In an example where there are four locations, the same check may be executed four times (once per location) against the same application being monitored.

A monitoring system of a system performing the relevant check may emulate a human, and, thus, may communicate (e.g. remotely) with the application being monitored, providing input to the application and receiving input, typically via the same connection method as a user, for example via ISP of the application being monitored. For example a computing device 203 for calculating uptime and downtime, or a monitored process executed by a server 207, may interface, via a network, with a computing device of devices $201_{1-N}$, performing monitoring or checks. Input provided to monitored applications may include for example credentials, such as username, account number, password, etc., in order to authenticate into the applications being monitored (if protected by IDs and passwords). A monitoring service (e.g. executed by devices $201_{1-N}$ or another computer system) may directly access and execute the checks on the applications being monitored. Such monitoring preferably mimics a human user's action when possible.

For each internet-based software system, such as a web service or web application, provided to a customer, each of the plurality of computing devices $201_{1-N}$ may, during each time interval of a monitoring period, perform each of a plurality of check suites on the internet-based software from a different geolocation. If, for a time interval, one of the computing devices $201_{1-N}$ determines that no checks in a check suite timed out or returned a failed response more than a predetermined amount of times, the computing device that performed that check suite may transmit the result to computing device 203, and computing device 203 may record, in a database, an indication of success for the check suite for that interval along with the geolocation of the computing device that performed that check suite.

In response to one of the computing devices $201_{1-N}$ determining that a check in a check suite timed out or returned a failed response more than a predetermined amount of times for a time interval, the computing device that performed that check suite may transmit the result to the computing device 203, and the computing device 203 may record, in the database, an indication of failure for the check suite for that interval along with the geolocation of the computing device that performed that check suite. For each indication of failure, the computing device performing that performed that check may calculate a check ratio, according to, for example EQN. 3, for the check suite for that time interval, and transmit the check ratio to the computing device 203 to store in the database with its corresponding indication of failure.

Typically, when testing across multiple locations all locations may have to report that the monitoring failed in order for that moment or interval, to be counted as down and result in a moment of downtime. While in some embodiments, if each location reports down time via the same check, that is deemed downtime, in other embodiments, if each of a plurality of locations reports down time because of a failure of a different suite or check, but during the same period, that may also be deemed downtime. For example, if location A fails suite 1, location B fails suite 2 and location C fails suite 3, during the same time interval, that time interval may be deemed to have downtime.

For each time-interval in the monitoring period having at least one indication of failure stored in the database, if, for a check suite, an indication of failure was not stored for each of the different geolocations of computing devices $201_{1-N}$, then the computing device 203 may record, in the database, an indication of uptime for the check suite for that interval along with its check ratio. If, for a check suite, an indication of failure was stored for each of the different geolocations of computing devices $201_{1-N}$, then the computing device 203 may record, in the database, an indication of downtime for the check suite for the time interval along with a check ratio for the check suite for the time interval.

For each check suite for an internet-based software provided to a customer, the computing device 203 may store an associated suite-based weighing factor (SW) in the database. The computing device 203 may store a list of exempt time periods in the database. The computing device 203 may store a list of a plurality of time periods each having an associated time-based weighing factor (TW) in the database.

For each time interval in the monitoring period having at least one indication of downtime, the computing device 203 may calculate a suite-based weighted downtime (SWDT) for the time interval by multiplying the total amount of time (t(I)) of the time interval by the sum of each suite-based weighing factor $\Sigma_{i=1}^{n} SW_i$ of each check suite that corresponds to one of the at least one indication of downtime, for example, according to EQN. 4. The computing device 203 may cap the suite-based weighted downtime (SWDT) for the time interval so that it cannot be larger than the total amount of time (t(I)) of the time interval.

For each time interval in the monitoring period having a suite-based weighted downtime (SWDT), the computing device 203 may determine if the time interval occurred during any exempt time period in the list of exempt time periods. If the time interval occurred during at least one of the exempt time periods, then the suite-based weighted downtime (SWDT) may not be utilized by the computing device 203 to calculate the total amount of downtime ($DT_{total}$) for the monitoring period. If the time interval did not occur during any of the exempt time periods, then the computing device 203 may determine a total time-based weighing factor $TW_{total}$ for the time interval.

If the time interval only occurred during one of the plurality of time periods, then the total time-based weighing factor $TW_{total}$ for the time interval may be the time-based weighing factor (TW) that corresponds to that time period. If the time interval occurs during two or more overlapping time periods of the plurality of time periods (e.g. two defined time periods sharing a certain time range, e.g. where a special time period such as maintenance occurs at the same time as other time periods), then the total time-based weighing factor $TW_{total}$ may be the product of the time-based weighing factor TW of each of the overlapping time periods.

The computing device 203 may calculate a total weighted downtime (WDT) by multiplying the suite-based weighted downtime (SWDT) for the time interval by the product of each time-based weighing factor ($TW_{total}$) corresponding to the time interval, according to, for example, EQN. 6.

The computing device 203 may calculate a total amount of downtime ($DT_{total}$) for a monitoring period for the internet-based software by summing each of the total weighted downtimes (WDT) for each time interval in the monitoring period having at least one indication of downtime. The computing device 203 may calculate the total amount of uptime ($UT_{total}$) for the monitoring period by subtracting the total amount of downtime for the monitoring period from the total amount of time of the monitoring period, according to, for example, EQN. 8. The computing device 203 may calculate an uptime percentage (uptime %) for the monitoring period by dividing the total amount of uptime $UT_{total}$ for the monitoring period by the total amount of time, t(m) of the monitoring period, and multiplying that by 100%, according to, for example, EQN. 9.

Computing device 205 may have a graphical user interface that may allow employees of the service provider, such as a technical account manager ("TAM"), view the uptime percentage (uptime %) for each internet-based software service provided to a customer. The user interface may provide the service provider the ability to, for each customer, view a list of check suites that resulted in downtime being stored for a time interval, view which check in the failed check suite failed, view where the check suite failed, view whether the customer reported the downtime, view whether the downtime was credited to the customer, and view a root cause analysis for the downtime.

Figure 3:
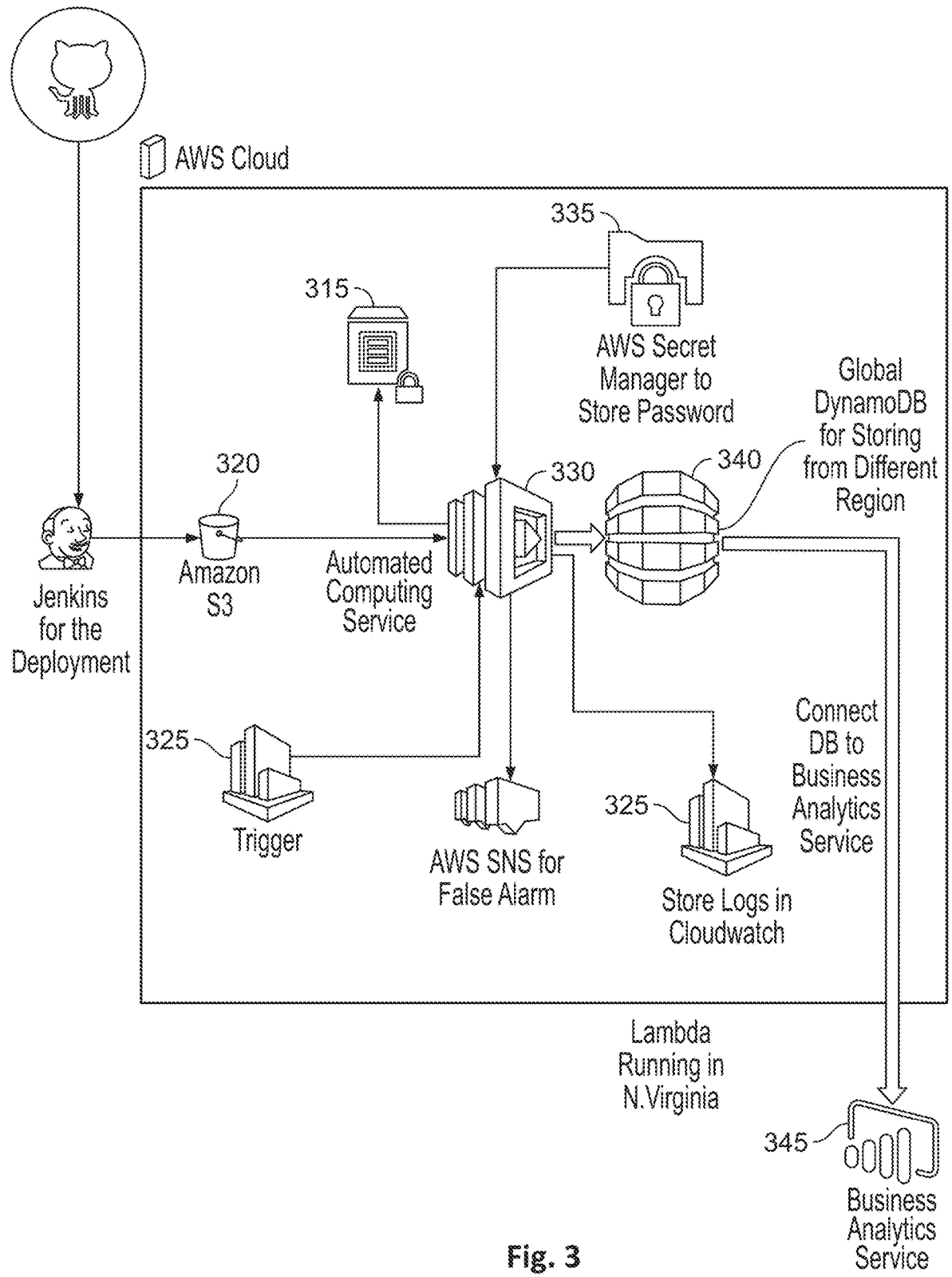
FIG. 3 is an exemplary system for monitoring uptime of internet-based software, according to embodiments of the present invention.

Reference is made to FIG. 3, which is an exemplary system for monitoring or determining uptime of internet-based software, according to embodiments of the present invention. Various modules or computer systems shown in FIG. 3 may be executed by, or may be, a computer system as shown in FIG. 1.

A monitoring, scheduling or observability service 325, such as Amazon CloudWatch's monitoring and observability service, may automatically trigger the start of a monitoring cycle (dictating when checks are to be run) for each interval and captures the logs (e.g. details of the execution of check suites) for each run.

An automated computing service 330 (e.g. executed by a server or computing device), such as Amazon AWS Lambda's computing platform, may, in response to the monitoring and observability service triggering the start of the monitoring cycle for an interval, for each internet-based software system, such as a web service, being provided to customers, execute checks and/or cause one or more processors (e.g., $201_{1-N}$) to automatically execute a plurality of stored check suites corresponding to the internet-based software, e.g. apply the checks to the target software, and cause the resulting data to be stored in the relevant database(s). For each internet-based software, the automated computing service may store the results of check-suite performed on the internet-based software for each interval in a database 340, such as Amazon DynamoDB's NoSQL database.

A business analytics service 345, such as Microsoft Power BI's business analytics service, may be utilized to allow users to drill into or investigate the data to the level necessary for them to complete their role. The data collected may be condensed and organized into periods, e.g. into a month to date uptime dataset. A user may expand or drill down into the summaries, such as uptime data, and see a down time report, a summary of the down time during the month that the uptime drilled down through represents.

Reference is made to FIG. 4, which is an exemplary screenshot of a graphical user interface for viewing the results of check suites performed, according to embodiments of the present invention. The graphical user interface may be displayed on a monitor of one or more computing devices (e.g., 205) of a service provider. The graphical user interface may display a plurality of check suites performed during a monitoring period. Data shown on each line includes the result of a monitoring cycle including the cluster, the suite, the check, the location, the result, and any other data that might be valuable, such as details on any fails that might occur. For each check suite performed, the graphical user interface may display the cluster on which it was performed may be identified, a time stamp number, the application, the geolocation from which a computing device (e.g., $201_{1-N}$) performed the check suite from, the result of the check suite, and the type of test of the check suite. The cluster may be a plurality of computing devices running the same internet-based software system, such as a web service. A time stamp may indicate the moment when the monitoring cycle started, and that the result collected will be representative of. An "application" may indicate the name given to the application being monitored so the user or customer knows which system was tested (users may have multiple systems being monitored).

Figure 5:
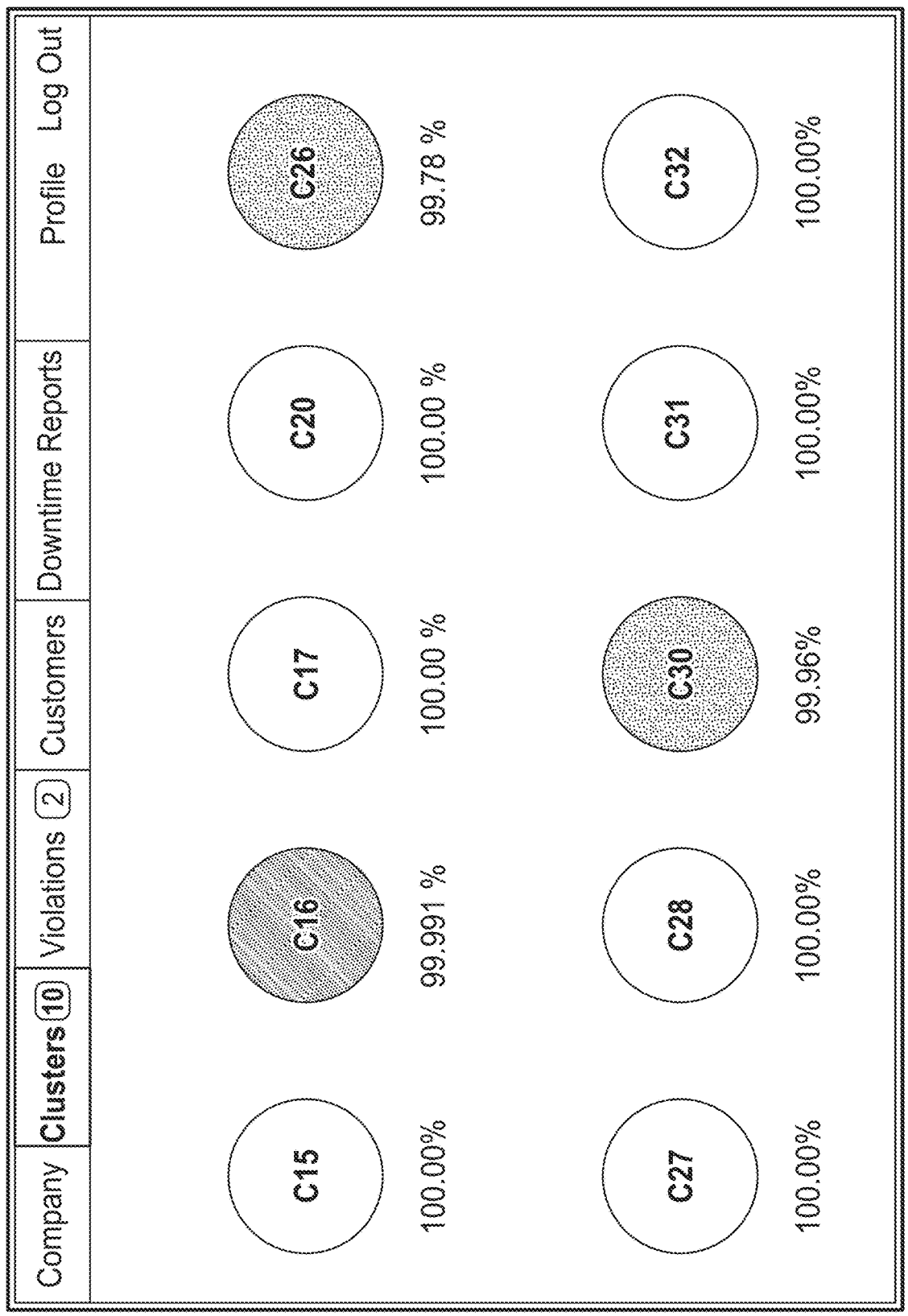
FIG. 5 is an exemplary screenshot of a graphical user interface for viewing uptime percentages of a plurality of clusters.

Reference is made to FIG. 5, which is an exemplary screenshot of a graphical user interface for viewing uptime percentages of a plurality of clusters. The graphical user interface may be displayed on a monitor of one or more computing devices (e.g., 205) of a service provider.

Reference is made to FIG. 6, which is an exemplary screenshot of a graphical user interface for viewing violations of an SLA, according to embodiments of the present invention. The graphical user interface may be displayed on a monitor of one or more computing devices (e.g., 205) of a service provider. The graphical user interface may display each cluster of customers that utilize the same internet-based software system provided by the service provider. Employees of the service provider may click on a cluster to be able to view information on each customer in the cluster. The information on each customer in the 7 cluster may include the customer name, the date of the violation, a note regarding the violation, such as whether the customer reported the outage or not or if the customer was credited for the outage, and a root cause analysis for the customer's outage. A root cause related number may describe a "case" such as a Salesforce case detailing the root cause analysis. Root cause analysis may refer to a process of determining the fundamental reason that something fails. The surface level reason for a failure may be a symptom rather than the real cause.

Reference is made to FIG. 7, which is an exemplary screenshot of a graphical user interface for viewing the status of checks performed for a customer, according to embodiments of the present invention. The graphical user interface may be displayed on a monitor of one or more computing devices (e.g., 205) of a service provider. The graphical user interface may display a plurality of checks performed for a customer. For each check, the graphical user interface may display the date the check was performed, the status of the check (e.g., whether the function being checked was up or down), the check suite that the check belongs to, the function that the check is testing, and a note regarding the performance of the check, such as whether a request timed out.

Figure 8:
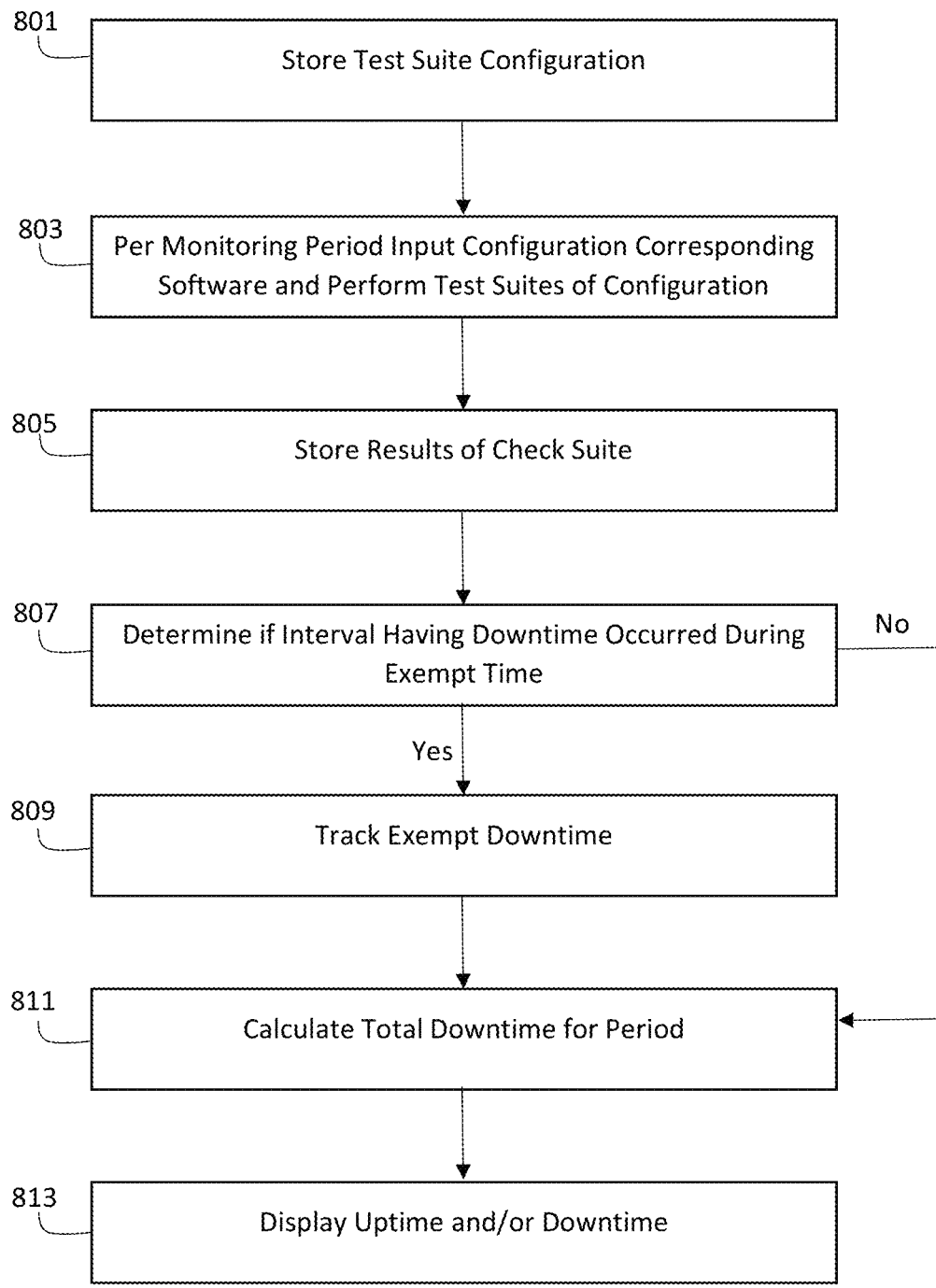
FIG. 8 is an exemplary flowchart of a method for calculating uptime of internet-based software, according to embodiments of the present invention.

Reference is made to FIG. 8, which is an exemplary flowchart of a method for calculating or determining uptime or downtime of internet-based software systems, according to embodiments of the present invention. The operations of FIG. 8 may be performed using systems as described elsewhere herein, or using other suitable systems. In step 801, one or more memories of or associated with one or more processors of for example a cloud computing platform, such as AWS, may store a configuration of test suites for each internet-based software being monitored, and how often to trigger the performance of the test, such as the start times for each time interval in a monitoring period, for example, in a configuration database. For example, an Amazon AWS CloudFormation script may cause one or more processors to store the configuration of the test suites in a database of a data management and secrets management service, such as AWS Systems Manager Parameter Store.

In step 803, at the start of each time interval of a monitoring period, for each internet-based software system being monitored, the one or more processors of the cloud computing platform may read or input the configuration corresponding to the internet-based software system, and may perform each of the test suites of the configuration on the internet-based software system during the time interval. For example, a monitoring and observability service, such as Amazon CloudWatch, may read the configuration corresponding to an internet-based software system, and, at a start time for each interval of a monitoring period, trigger or execute an automated computing service, such as the Amazon AWS Lambda service, to perform each of the test suites of the configuration on the internet-based software system during the interval. The process performing the test suites may require information such as credential information, e.g. an ID and password.

In step 805, for each time interval, a results database, such as the Amazon DynamoDB system, of the one or more processors of the cloud computing platform may store the results of each check suite performed in the time interval.

In step 807, for each interval having downtime, one or more processors (e.g., 203) of a business analytics service, such as Microsoft BI, may determine if the time interval occurred during a period of time in a list of exempt time periods for the internet-based software system. Exempt time periods may be agreed upon with an end user. If the time interval having downtime during an exempt time period, in step 809, the one or more processors of the business analytics service may track exempt downtime by storing, in an exempt time database, the start and end time of each exempt downtime time. In some embodiments, the one or more processors do not include any exempt downtime from that time interval in calculating a total amount of downtime (or uptime) for an internet based software system. A computing device 203 or a process executed on a server, or a process executed in a cloud service (e.g. AWS) may calculate factors of uptime and report them to a business analytics service 345, such as the Microsoft Power BI business analytics service.

In step 811, the one or more processors of the cloud computing platform may, for each internet-based software system being monitored, calculate a total amount of downtime or uptime for the monitoring period by summing the downtime of each interval that did not occur during a time period in the list of exempt time periods for the internet-based software system. A measure of uptime or downtime may be calculated.

In step 813, one or more processors of the business analytics service, may display, on a monitor of one or more processors (e.g. 205) of a service provider, the total amount of uptime, for example expressed as an uptime percentage, or downtime for the monitoring period for each internet-based software system for each different customer, and drill down to allow an employee, such as an technical account manager ("TAM"), of the service provider to view information regarding the performance of the check suites, such as the results of each time interval, view exempt downtimes for each internet-based software system provided to a customer, view a root cause analysis for a downtime, and view whether a customer reported the downtime. A TAM may provide account management and high-level technical support to project teams and customers.

Figure 9:
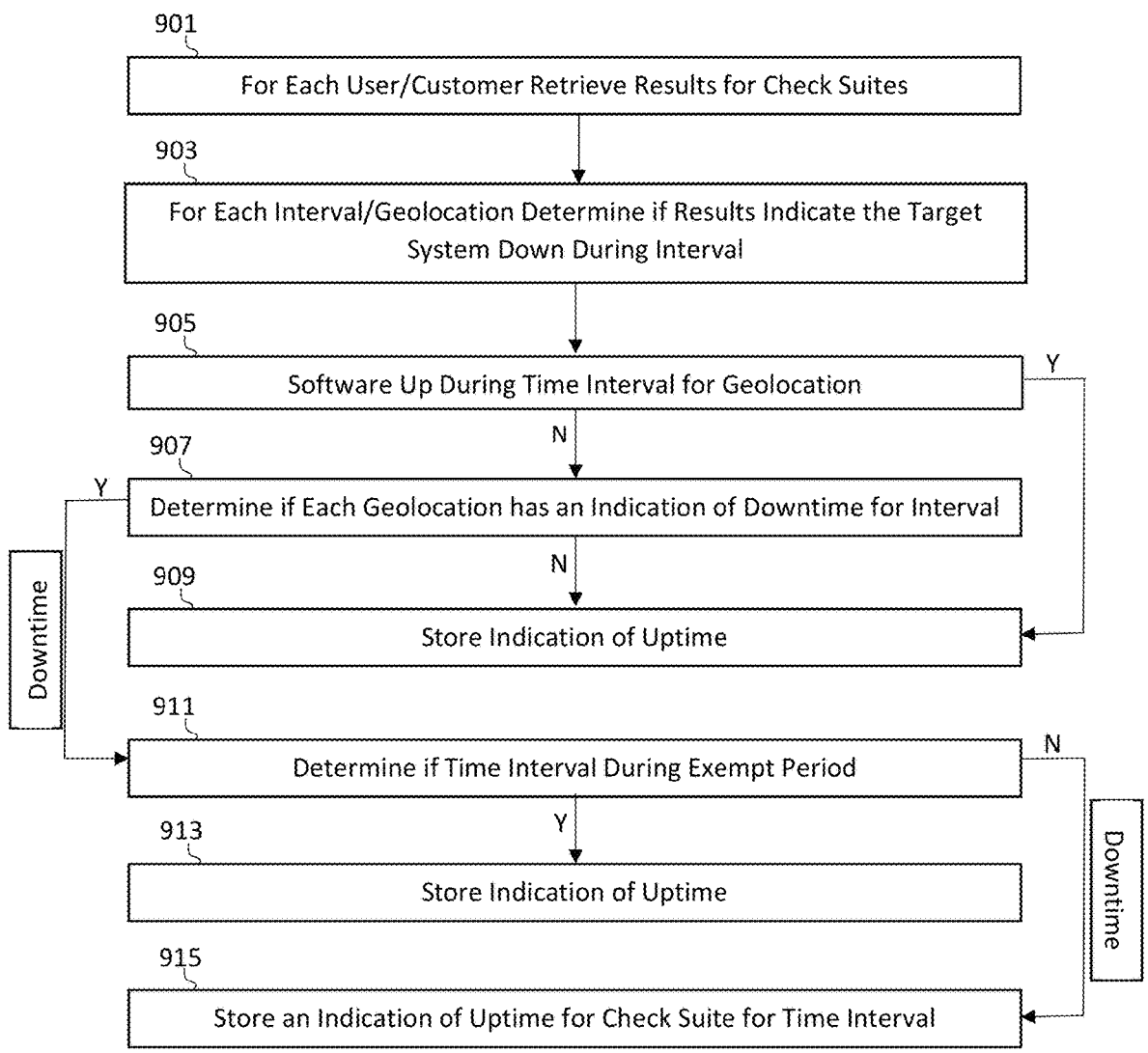
FIG. 9 is an exemplary flowchart of a method for calculating uptime of internet-based software, according to embodiments of the present invention.

Reference is made to FIG. 9, which is an exemplary flowchart of a method for calculating uptime of internet-based software, according to embodiments of the present invention. The operations of FIG. 9 may be performed using systems as described elsewhere herein, or using other suitable systems.

In step 901, for each customer being provided an internet-based software system, one or more processors (e.g., 203) may, for each time interval in a monitoring period, retrieve, from a database, results for a plurality of the same check suites performed, by each of a plurality of processors (e.g., 201$_{1-N}$) located in different geolocations, on the internet-based software system in the time interval.

In step 903, the one or more processors may, for each interval, for each geolocation, determine if the results of the check suites performed from the geolocation on the internet-based software system provided to the customer indicate the target system was down (e.g. not functioning, not functioning properly, or not functioning according to some standard) during the time interval. A failure may be determined or deemed based on for example the failure of a check: such a failure may count as a down time. Such down time may be modified by, for example weighting, location, and exempt time. In one embodiment, all relevant monitoring locations must report the application being monitored as down in order for the application being monitored to be considered or deemed down. In some embodiments, all locations or monitoring processes must generate a fail for the same interval for that interval to be considered a moment of down time. If the one or more processors determine that the internet-based software system was down during the time interval for the geolocation, the one or more processors may output, pass or transmit an indication of downtime, such as a one or "DN", for the geolocation for the time interval to step 907. In step 905, if the one or more processors determine that the internet-based software system was up (e.g. functioning, functioning properly, or functioning according to some standard) during the time interval for the geolocation, the one or more processors may store an indication of uptime, such as a zero or "UP", for the geolocation for the time interval in the database.

In step 907, the one or more processors may determine if each geolocation has an indication of downtime for the internet-based software system for the time interval. If the each of the geolocations has an indication of failure stored for it for the interval, the one or more processors may output or pass an indication of downtime to step for the interval 911. In step 909, if at least one geolocation does not have an indication of downtime for it for the interval, then the one-or more processors may store an indication of uptime, such as a one or "UP" for the time interval in the database. The process may stop at step 909.

In step 911, if an indication of downtime was passed from step 907 for the interval, the one or more processors may determine if the time interval occurred during an exempt time period. If the time interval did not occur during an exempt time period, in step 915, the one or more processor may store an indication of downtime for the time interval. If the time interval occurred during an exempt time period, in step 913, the one or more processors may store an indication of uptime for the check suite for the time interval in the database and store the start and stop times of the interval in an exempt downtime database. The indications of downtime from step 915 may be utilized to calculate the downtime for the time interval.

The one or more processors may store a data structure in the database which may be a relational database table storing the results of each check performed. The following is an example relational database Table 1:

TABLE 1

| i Interval | s System | A Application | cs Suite | c Check | l Location | r Result | m Message |
|---|---|---|---|---|---|---|---|
| date/ time | text | Text | text | text | text | UP \| DN | Text |

Other data storage structures may be used. The relational database table may, for each check performed, store the date and time of the interval that the check was performed in, store an identifier, such as the name, of the internet-based software system (which may include one or more applications) the check was performed on, store an identifier of the check suite which the check belongs to, store an identifier of the check, store an identifier of the geolocation the check was performed, store the result of the determination of whether the check was up or down, and store a message, such as warnings or errors during the check, that was returned as a result of the performance of the check.

The first row of table may include variable names used in the system, the second row of the table may include the column names in the database, and the third row may be the type of data being captured and stored. Information such as the check suite, the check, and the geolocation may be represented as text, while in a model used by some embodiments they may be numeric. Many data types may be text or alphanumeric, but may be converted to numbers for convenience. For example, suites and checks may, instead of being labeled alphanumerically, be labelled with numbers. For example, a check 2 of suite 4 may indicate failed 1, which describes the event but not clearly, unless the number is translated to a human meaningful label). Embodiments may use an optimization using compressed and mathematically accessible data types as opposed to more human readable data types; a translation to human-readable terms may be used. In one example, a first suite is a "standard operation" and the first check in that suite is called "login", and thus it is easier for humans to understand than if these terms are converted to numbers.

Embodiments of the present invention may allow monitoring deep inside applications, rather that merely at a surface level; further the various processes and equation discussed herein allow for transparent and adjustable monitoring systems. Embodiments of the invention provide improvements over some prior methods, where such prior methods may monitor for full application outages, and which for example may wait a period (e.g. 15 minutes) to ensure that the application truly is down rather than a fluke of a test. Embodiments of the present invention may detect these general outages but in addition other failures.

Figure 10:
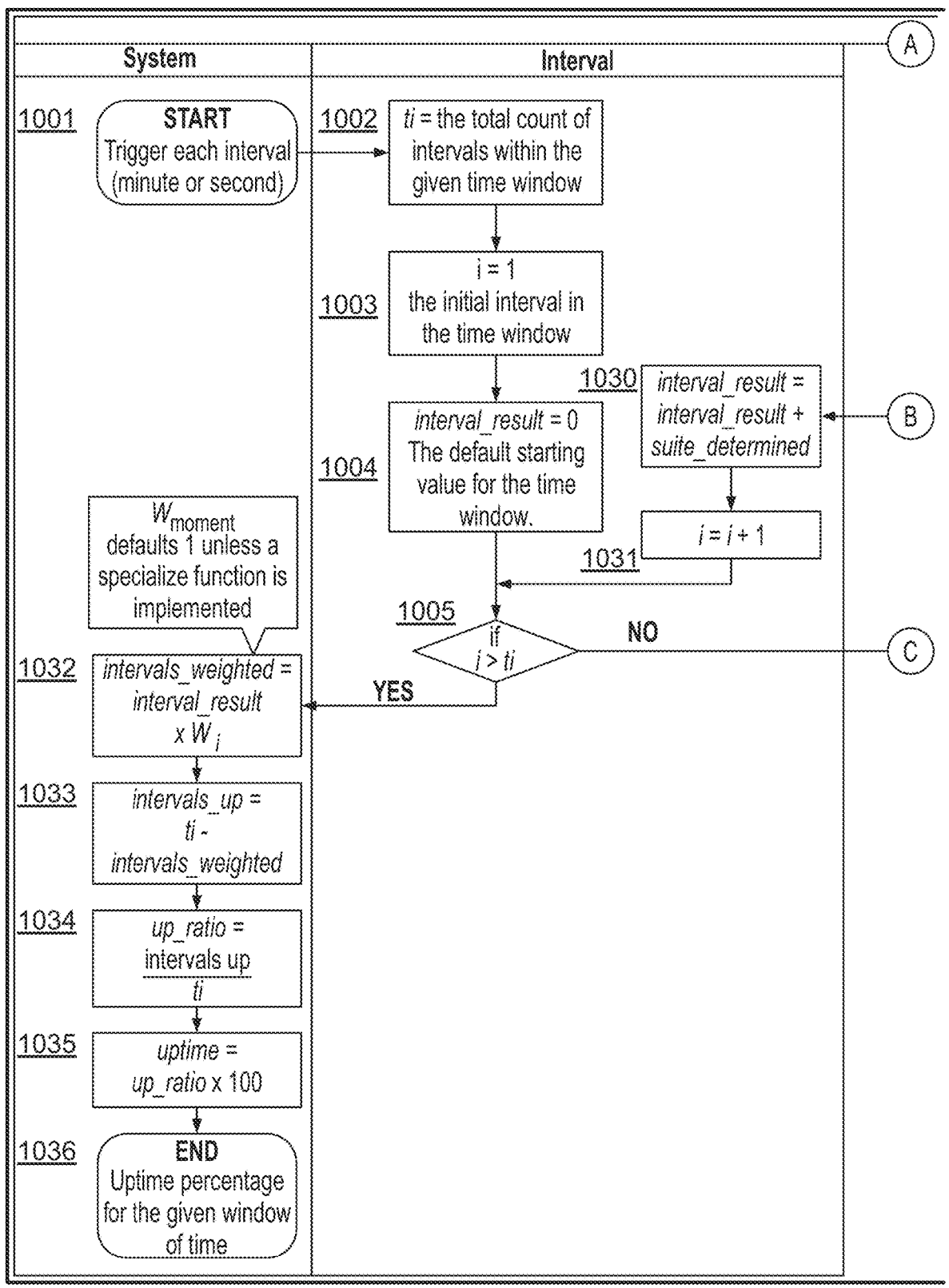
FIG. 10 is an exemplary flowchart of a method for calculating uptime of internet-based software, according to embodiments of the present invention.

Reference is made to FIG. 10, which is an exemplary flowchart of a method for calculating uptime of internet-based software systems, according to embodiments of the present invention. The operations of FIG. 10 may be performed using systems as described elsewhere herein, or using other suitable systems.

In step 1001, one or more processors (e.g., 203) may trigger the start of each interval of a monitoring period for an internet-based software system.

In step 1002, the one or more processors may set a total count ($t_i$) of all intervals of the monitoring period. In step 1003, the one or more processors may set an interval count (i) to be one. In step 1004, the one or more processors may initially set a total amount of intervals having downtime (interval_result) for the monitoring period to be zero. In step 1005, the one or more processors may determine if the interval count (i) is greater than the total count ($t_i$) of all intervals of the monitoring period. If the interval count (i) is not greater than the total count ($t_i$) of all intervals, then the one or more processor may proceed to step 1006. If the interval count (i) is greater than the total count ($t_i$) of all intervals, then the one or more processors may proceed to step 1032.

In step 1006, the one or more processors may set a total count ($t_s$) of all the test suites to be executed in the current interval for the internet-based software system. In step 1007, the one or more processors may set a suite count identifier (s) to be one. In step 1008, the one or more processors may initially set the total amount of check suites having downtime (suite_result) for the current interval to be zero. In step 1009, the one or more processors may determine if the suite count identifier (s) is greater than total count ($t_s$) of all the test suites to be executed in the current interval. If the suite count identifier (s) is not greater than total count ($t_s$) of all the test suites, then the one or more processors may proceed to step 1010. If the suite count identifier (s) is greater than total count ($t_s$) of all the test suites, then the one or more processors may proceed to step 1028.

In step 1010, the one or more processors may set a total count (tc) of the checks in the current check suite. In step 1011, the one or more processors may set a check count identifier (c) to be one. In step 1012, a CHECK_RESULT=0 operation may be performed, such that for all checks, the check returns a zero unless a failed check occurs, such that it returns a 1, meaning one interval of down time. In step 1011, the one or more processors may determine if the check count identifier (c) is greater than the total count (tc) of the checks in the current check suite. If the check count identifier (c) is not greater than the total count (tc) of the checks in the current check suite, the one or more processors may proceed to step 1014. If the check count identifier (c) is greater than the total count (tc) of the checks in the current check suite, the one or more processors may proceed to step 1028.

In step 1014, the one or more processors may set a total count (tl) of different geolocations that the current check suite will be ran from. In step 1015, the one or more processors may initially set a suite geolocation identifier (l) to be one. In step 1016, a LOCATION_RESULT=0 operation may be performed, such that for all locations, the check for that location returns a zero unless a failed check for that location occurs, such that it returns a 1, meaning one interval of down time. In step 1017, the one or more processors may determine if the suite geolocation identifier (l) is greater than the total count (tl) of different geolocations. If the suite geolocation identifier (l) is not greater than the total count (tl) of different geolocations, then the one or more processors may proceed to step 1018. If the suite geolocation identifier (l) is greater than the total count (tl) of different geolocations, then the one or more processors may proceed to step 1021.

In step 1018, the one or more processors may retrieve the results ($R_{i,s,c,l}$) of the current check of the current check suite for the current geolocation for the current interval.

In some embodiments multiplication of a result by the prior result (e.g. locationresult) results in no change in value if the multiplication is by a 1, indicating downtime: the identity of 1 is used to ensure that downtime is present. This is illustrated in the following table, showing four locations. All four example locations have to report downtime, fails, in order for the downtime to be moved on to the next stage of the process, and that result is the result of the check (success=0/fail=1) and the location_result starts off each loop as 1 (identity):

TABLE 2

| description | result(1) | result(2) | result(3) | result(4) | location_result |
|---|---|---|---|---|---|
| location_result = location_result * result( location ) | | | | | |
| No Fails | 0 = 1 * 0 | 0 = 0 * 0 | 0 = 0 * 0 | 0 = 0 * 0 | 0 |
| One Fail | 1 = 1 * 1 | 0 = 1 * 0 | 0 = 0 * 0 | 0 = 0 * 0 | 0 |
| Two Fails | 1 = 1 * 1 | 1 = 1 * 1 | 0 = 1 * 0 | 0 = 0 * 0 | 0 |
| Three Fails | 1 = 1 * 1 | 1 = 1 * 1 | 1 = 1 * 1 | 0 = 1 * 0 | 0 |
| Four Fails | 1 = 1 * 1 | 1 = 1 * 1 | 1 = 1 * 1 | 1 = 1 * 1 | 1 |

In step 1019, if a location_result=location_result*result (location_result multiplied by result) is positive, the one or more processors may increase the suite geolocation identifier (l) by one, and return to step 1017. If at step 1017, the suite geolocation identifier (l) is not greater than the total count (tl) of different geolocations the one or more processors may proceed to perform steps 1018-1020 for the next geolocation for the current check. In step 1021, In step 1022, the one or more processors may increase the check count identifier (c) by one (Check_result is set equal to check_result added to location result), and return to step 13. If, in step 1022, the check count identifier (c) is not greater than the total count (tc) of the checks in the current check suite, then the one or more processors may proceed to perform steps 1014-1022 for the next check. If, in step 1022, the check count identifier (c) is greater than the total count (tc) of the checks, then the one or more processors may proceed to step 1023.

In step 1023, the one or more processors may determine a check ratio according to, for example, EQN. 2, for the current check suite. In step 1024, the one or more processors may In step 1025, the one or more processors may calculate a suite-based weighted downtime for the current check suite for the current time interval by multiplying a suite-based weighing factor corresponding to the current check suite by one. Check_normalized may be equal to the result of using the mathematical operation of a "ceiling" on the value check_rotation. A ceiling operation is similar to averaging with the modification of, instead of rounding if the result is halfway between two integers, it rounds up if it is not the lower of the two possible integers. In step 1026, the one or more processors may add the suite-based weighted downtime to the total amount of check suites having downtime (suite_result) for the current interval.

In step 1027, the suite count identifier (s) may be increased by one, and the one or more processors may return to step 1009. If in step 1009, the suite count identifier (s) is not greater than total count ($t_s$) of all the test suites, then the one or more processors may proceed to perform steps 1010 to 1027 for the next check suite. If in step 1009, the suite count identifier (s) is greater than total count ($t_s$) of all the test suites, then the one or more processors may proceed to step 1028.

In step 1028, the one or more processors determine a total bounded amount of check suites having downtime (B(suite_result)) for the current time interval that may caped or limited so that it may not be greater than one or less than zero. If the total amount of check suites having downtime (suite_result) for the current time interval is greater than one, then the total bounded amount of check suites having downtime (B(suite_result)) may be set to the total amount of time of the current time interval. If the total amount of check suite having downtime (suite_result) for the current time interval is less than zero, then the total bounded amount of check suites having downtime (B(suite_result)) may be set to zero. If the total amount of check suites having downtime (suite_result) for the current time interval is not greater than one or less than 0, then the total bounded amount of check suites having downtime (B(suite_result)) may be set to the total amount of check suites having downtime (suite_result) for the current time interval. In step 1029, the one or more processors may determine if the current time interval occurred during an exempt time period. If the current time interval occurred during an exempt time period, the one or more processors may set the total bounded amount of check suites having downtime (B(suite_result)) for the current time interval to be zero.

In step 1030, the one or more processors may add the total bounded amount of check suites having downtime (B(suite_result)) for the current time interval to the total amount of intervals having downtime (interval_result) for the monitoring period. In step 1031, the one or more processors may increase the interval count (i) by one, and return to step 1005. If, in step 1005, the interval count (i) is not greater than the total count ($t_i$) of all time intervals, then the one or more processor may proceed to step 1006 to 1031 for the next time interval. If, in step 1005, the interval count (i) is greater than the total count ($t_i$) of all intervals, then the one or more processor may proceed to step 1032.

In step 1032, the one or more processors may calculate a total weighted amount of time intervals having downtime (interval_weighted) for the monitoring period by multiplying the total amount of intervals having downtime (interval_result) for the monitoring period by at least one time-based weighing factor corresponding to the monitoring period. In Step 1033, the one or more processors may calculate a total amount of time intervals (intervals_up) having uptime for the monitoring period by subtracting the total weighted amount of intervals having downtime (interval_weighted) for the monitoring period from the total amount ($t_i$) of all intervals in the monitoring period.

In step 1034, the one or more processors may calculate an uptime ratio (up_ratio) for the monitoring period by dividing the total amount of time intervals (intervals_up) having uptime for the monitoring period by the total amount ($t_i$) of all intervals in the monitoring period. In step 1035, the one or more processors may calculate an uptime percentage (uptime %) for the monitoring period by multiplying the uptime ratio (up_ratio) by one hundred percent. In step 1036, the process may terminate.

Alternatively, some aspects or functionality of the flow chart of FIG. 10 may be expressed by the following exemplary equation:

$$\text{uptime \%} = \frac{\left(ti - \sum_{i=1}^{ti}\left(B\left(\sum_{s=1}^{ts}\left(\left[\frac{\sum_{c=1}^{tc}\left(\prod_{l=1}^{tl} R_{i,c,s,l}\right)}{tc}\right] \times F_s\right)\right) - E_1\right) \times W_i\right)}{ti} \times 100\% \qquad \text{EQN. 10}$$

where uptime % is a percentage representing how often an internet-based software system was up during a monitoring period, $t_i$ is a total amount of time intervals in the monitoring period, i is an index of summation representing the interval count, $t_s$ is a total count of all the test suites to be executed in each time interval, s is an index of summation representing the suite count identifier, tc is a total count of the checks in the current check suite, c is an index of summation representing a check count identifier, tl is a total count of different geolocations that the current check suite will be ran from, l is an index of summation representing a suite geolocation identifier, $R_{i,s,c,l}$ is the results the current check of the current check suite for the current geolocation for the current interval, $F_s$ is a suite-based weighing factor corresponding to the current check suite, B( ) is a total bounded amount of check suites having downtime for the current interval, $E_i$ cancels out the bounded amount of check suites having downtime for the current interval if the current interval is exempt, and $W_i$ is a time-based weighing factor corresponding to the current interval.

It will thus be seen that the objects set forth elsewhere herein, among those made apparent from the preceding description, are efficiently attained and, because certain changes may be made in carrying out the method described elsewhere herein and in the construction(s) set forth without departing from the spirit and scope of the invention, it is intended that all matter contained in the above description and shown in the accompanying drawings shall be interpreted as illustrative and not in a limiting sense.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

It is also to be understood that the following claims are intended to cover all of the generic and specific features of the invention herein described and all statements of the scope of the invention which, as a matter of language, might be said to fall therebetween.

What is claimed is:

1. A system for automated uptime determination of internet-based software, the system comprising:
   one or more memories storing a plurality of check suites, wherein each check suite of the plurality of check suites comprises an ordered sequence of a plurality of checks corresponding to an execution flow of an ordered sequence of functions of the internet-based software;
   one or more processors configured to determine a total amount of downtime for a monitoring period by:
   during each time interval of the monitoring period, performing each check suite of the plurality of check suites on the internet-based software, and
   applying at least one weighing factor to results of performing each check suite of the plurality of check suites on the internet-based software, and
   wherein the one or more memories store the at least one weighing factor, and wherein the at least one weighing factor comprises a first time based weighing factor corresponding to a first period of time, and a second time based weighing factor corresponding to a second period of time; and
   the one or more processors are configured to generate a weighted downtime by, for each time interval of the monitoring period having a stored indication of downtime:
   applying the first time based weighing factor to an amount of time of the time interval of the monitoring period if the time interval of the monitoring period occurred during the first period of time; and
   applying the second time based weighing factor to an amount of time of the time interval of the monitoring period if the time interval of the monitoring period occurred during the second period of time.

2. The system of claim 1, wherein:
   the one or more processors determining the total amount of downtime for the monitoring period comprises, for each time interval of the monitoring period, store, in the one or more memories, an indication of downtime if any check suite of the plurality of check suites failed during the time interval of the monitoring period; and
   the check suite of the plurality of check suites fails if at least one check of the check suite of the plurality of check suites on a function fails.

3. The system of claim 2, wherein:
   the one or more processors applying the at least one weighing factor to the results comprises, for each time interval of the monitoring period having a stored indication of downtime, generating a weighted downtime by applying the at least one weighing factor to an amount of time of the time interval of the monitoring period; and
   the one or more processors determining the total amount of downtime for the monitoring period comprises summing each weighted downtime for the monitoring period.

4. The system of claim 2, wherein:
   the one or more processors are located in a plurality of geolocations, wherein the one or more processors comprise at least a first processor in a first geolocation and at least a second processor in a second geolocation which is different from the first geolocation, and wherein the one or more processors are configured to:
   for each time interval of the monitoring period, at each geolocation of the plurality of geolocations, perform each check suite of the plurality of check suites on the internet-based software; and
   store, in the one or more memories, an indication of downtime for a time interval only if the at least one check of the check suite of the plurality of check suites failed in each geolocation of the plurality of geolocations during the time interval of the monitoring period.

5. The system of claim 2, wherein the one or more processors are configured to, for each check of the at least one check of the check suite of the plurality of check suites, stop performing the check suite of the plurality of check suites in response to a check of the check suite of the plurality of check suites on a function failing.

6. The system of claim 5, wherein the one or more processors are configured to, for each time interval of the monitoring period having a stored indication of downtime, divide an amount of checks of the check suite of the plurality of check suites performed by a total amount of checks of the check suite of the plurality of check suites.

7. The system of claim 1, wherein the first time based weighing factor is 0, and the second time based weighing factor is 1.

8. The system of claim 1, wherein:
   the one or more memories store the at least one weighing factor, wherein the at least one weighing factor comprises a criticality weight for each check suite of the plurality of check suites, and wherein at least two check suites of the plurality of check suites have a different criticality weight; and
   the one or more processors are configured to generate a weighted downtime by, for each time interval of the monitoring period having a stored indication of downtime, applying the criticality weight corresponding to the check suite of the plurality of check suites that failed during that time interval of the monitoring period to an amount of time of the time interval of the monitoring period.

9. The system of claim 1, wherein the one or more processors are configured to:
   determine a total amount of uptime by subtracting the total amount of downtime from a total amount of time of the monitoring period; and
   determine an availability ratio by dividing the total amount of uptime from the total amount of time of the monitoring period.

10. A method for automated uptime determination of internet-based software, the method comprising:
  storing a plurality of check suites, wherein each check suite of the plurality of check suites comprises an ordered sequence of a plurality of checks corresponding to an execution flow of an ordered sequence of functions of the internet-based software;
  determining a total amount of downtime for a monitoring period by:
  during each time interval of the monitoring period, performing each check suite of the plurality of check suites on the internet-based software, and
  applying at least one weighing factor to results of performing each check suite of the plurality of check suites on the internet-based software, and
  wherein the at least one weighing factor comprises a first time based weighing factor corresponding to a first period of time, and a second time based weighing factor corresponding to a second period of time; and
  generating a weighted downtime by, for each time interval of the monitoring period having a stored indication of downtime:
  applying the first time based weighing factor to an amount of time of the time interval of the monitoring period if the time interval of the monitoring period occurred during the first period of time; and
  applying the second time based weighing factor to an amount of time of the time interval of the monitoring period if the time interval of the monitoring period occurred during the second period of time.

11. The method of claim 10, wherein:
  determining the total amount of downtime for the monitoring period comprises, for each time interval of the monitoring period, store, an indication of downtime if any check suite of the plurality of check suites failed during the time interval of the monitoring period; and
  the check suite of the plurality of check suites fails if at least one check of the check suite of the plurality of check suites on a function fails.

12. The method of claim 11, wherein:
  applying the at least one weighing factor to the results comprises, for each time interval of the monitoring period having a stored indication of downtime, generating a weighted downtime by applying the at least one weighing factor to an amount of time of the time interval of the monitoring period; and
  determining the total amount of downtime for the monitoring period comprises summing each weighted downtime for the monitoring period.

13. The method of claim 11, wherein:
  one or more processors are located in a plurality of geolocations, wherein the one or more processors comprise at least a first processor in a first geolocation and at least a second processor in a second geolocation which is different from the first geolocation, and wherein the one or more processors are configured to:
  for each time interval of the monitoring period, at each geolocation of the plurality of geolocations, perform each check suite of the plurality of check suites on the internet-based software; and
  store, in one or more memories, an indication of downtime for a time interval only if the at least one check of the check suite of the plurality of check suites failed in each geolocation of the plurality of geolocations during the time interval of the monitoring period.

14. The method of claim 11, further comprising, for each check of the at least one check of the check suite of the plurality of check suites, stopping performing the check suite of the plurality of check suites in response to a check of the check suite of the plurality of check suites on a function failing.

15. The method of claim 14, further comprising, for each time interval of the monitoring period having a stored indication of downtime, dividing an amount of checks of the check suite of the plurality of check suites performed by a total amount of checks of the check suite of the plurality of check suites.

16. The method of claim 10, further comprising:
  storing the at least one weighing factor, wherein the at least one weighing factor comprises a criticality weight for each check suite of the plurality of check suites, and wherein at least two check suites of the plurality of check suites have a different criticality weight; and
  generating a weighted downtime by, for each time interval of the monitoring period having a stored indication of downtime, applying the criticality weight corresponding to the check suite of the plurality of check suites that failed during that time interval of the monitoring period to an amount of time of the time interval of the monitoring period.

17. The method of claim 10, further comprising:
  determining a total amount of uptime by subtracting the total amount of downtime from a total amount of time of the monitoring period; and
  determining an availability ratio by dividing the total amount of uptime from the total amount of time of the monitoring period.

18. A system for automated uptime determination of internet-based software, the system comprising:
  one or more memories storing a plurality of check suites, wherein each check suite of the plurality of check suites comprises an ordered sequence of a plurality of checks corresponding to an execution flow of an ordered sequence of functions of the internet-based software;
  one or more processors configured to determine a total amount of downtime for a monitoring period by:
  during each time interval of the monitoring period, performing each check suite of the plurality of check suites on the internet-based software, and
  applying at least one weighing factor to results of performing each check suite of the plurality of check suites on the internet-based software, and
  wherein the one or more processors determining the total amount of downtime for the monitoring period comprises, for each time interval of the monitoring period, store, in the one or more memories, an indication of downtime if any check suite of the plurality of check suites failed during the time interval of the monitoring period; and
  wherein the check suite of the plurality of check suites fails if at least one check of the check suite of the plurality of check suites on a function fails; and
  wherein the one or more processors applying the at least one weighing factor to the results comprises, for each time interval of the monitoring period having a stored indication of downtime, generating a weighted downtime by applying the at least one weighing factor to an amount of time of the time interval of the monitoring period; and
  wherein the one or more processors determining the total amount of downtime for the monitoring period comprises summing each weighted downtime for the monitoring period.

19. A system for automated uptime determination of internet-based software, the system comprising:
- one or more memories storing a plurality of check suites, wherein each check suite of the plurality of check suites comprises an ordered sequence of a plurality of checks corresponding to an execution flow of an ordered sequence of functions of the internet-based software;
- one or more processors configured to determine a total amount of downtime for a monitoring period by:
  - during each time interval of the monitoring period, performing each check suite of the plurality of check suites on the internet-based software, and
  - applying at least one weighing factor to results of performing each check suite of the plurality of check suites on the internet-based software, and
- wherein the one or more memories store the at least one weighing factor, wherein the at least one weighing factor comprises a criticality weight for each check suite of the plurality of check suites, and wherein at least two check suites of the plurality of check suites have a different criticality weight; and
- wherein the one or more processors are configured to generate a weighted downtime by, for each time interval of the monitoring period having a stored indication of downtime, applying the criticality weight corresponding to the check suite of the plurality of check suites that failed during that time interval of the monitoring period to an amount of time of the time interval of the monitoring period.

20. A system for automated uptime determination of internet-based software, the system comprising:
- one or more memories storing a plurality of check suites, wherein each check suite of the plurality of check suites comprises an ordered sequence of a plurality of checks corresponding to an execution flow of an ordered sequence of functions of the internet-based software;
- one or more processors configured to determine a total amount of downtime for a monitoring period by:
  - during each time interval of the monitoring period, performing each check suite of the plurality of check suites on the internet-based software, and
  - applying at least one weighing factor to results of performing each check suite of the plurality of check suites on the internet-based software, and
- wherein the one or more processors determining the total amount of downtime for the monitoring period comprises, for each time interval of the monitoring period, store, in the one or more memories, an indication of downtime if any check suite of the plurality of check suites failed during the time interval of the monitoring period; and
- wherein the check suite of the plurality of check suites fails if at least one check of the check suite of the plurality of check suites on a function fails; and
- wherein the one or more processors are located in a plurality of geolocations, wherein the one or more processors comprise at least a first processor in a first geolocation and at least a second processor in a second geolocation which is different from the first geolocation, and wherein the one or more processors are configured to:
  - for each time interval of the monitoring period, at each geolocation of the plurality of geolocations, perform each check suite of the plurality of check suites on the internet-based software; and
  - store, in the one or more memories, an indication of downtime for a time interval only if the at least one check of the check suite of the plurality of check suites failed in each geolocation of the plurality of geolocations during the time interval of the monitoring period.

21. A system for automated uptime determination of internet-based software, the system comprising:
- one or more memories storing a plurality of check suites, wherein each check suite of the plurality of check suites comprises an ordered sequence of a plurality of checks corresponding to an execution flow of an ordered sequence of functions of the internet-based software;
- one or more processors configured to determine a total amount of downtime for a monitoring period by:
  - during each time interval of the monitoring period, performing each check suite of the plurality of check suites on the internet-based software, and
  - applying at least one weighing factor to results of performing each check suite of the plurality of check suites on the internet-based software, and
- wherein the one or more processors determining the total amount of downtime for the monitoring period comprises, for each time interval of the monitoring period, store, in the one or more memories, an indication of downtime if any check suite of the plurality of check suites failed during the time interval of the monitoring period; and
- wherein the check suite of the plurality of check suites fails if at least one check of the check suite of the plurality of check suites on a function fails; and
- wherein the one or more processors are configured to, for each check of the at least one check of the check suite of the plurality of check suites, stop performing the check suite of the plurality of check suites in response to a check of the check suite of the plurality of check suites on a function failing; and
- wherein the one or more processors are configured to, for each time interval of the monitoring period having a stored indication of downtime, divide an amount of checks of the check suite of the plurality of check suites performed by a total amount of checks of the check suite of the plurality of check suites.

22. A method for automated uptime determination of internet-based software, the method comprising:
- storing a plurality of check suites, wherein each check suite of the plurality of check suites comprises an ordered sequence of a plurality of checks corresponding to an execution flow of an ordered sequence of functions of the internet-based software;
- determining a total amount of downtime for a monitoring period by:
  - during each time interval of the monitoring period, performing each check suite of the plurality of check suites on the internet-based software, and
  - applying at least one weighing factor to results of performing each check suite of the plurality of check suites on the internet-based software, and
- wherein determining the total amount of downtime for the monitoring period comprises, for each time interval of the monitoring period, store, an indication of downtime if any check suite of the plurality of check suites failed during the time interval of the monitoring period; and
- wherein the check suite of the plurality of check suites fails if at least one check of the check suite of the plurality of check suites on a function fails; and
- wherein applying the at least one weighing factor to the results comprises, for each time interval of the monitoring period having a stored indication of downtime, generating a weighted downtime by applying the at least one weighing factor to an amount of time of the time interval of the monitoring period; and wherein determining the total amount of downtime for the monitoring period comprises summing each weighted downtime for the monitoring period.

23. A method for automated uptime determination of internet-based software, the method comprising:

storing a plurality of check suites, wherein each check suite of the plurality of check suites comprises an ordered sequence of a plurality of checks corresponding to an execution flow of an ordered sequence of functions of the internet-based software;

determining a total amount of downtime for a monitoring period by:

during each time interval of the monitoring period, performing each check suite of the plurality of check suites on the internet-based software, and applying at least one weighing factor to results of performing each check suite of the plurality of check suites on the internet-based software, and storing the at least one weighing factor, wherein the at least one weighing factor comprises a criticality weight for each check suite of the plurality of check suites, and wherein at least two check suites of the plurality of check suites have a different criticality weight; and generating a weighted downtime by, for each time interval of the monitoring period having a stored indication of downtime, applying the criticality weight corresponding to the check suite of the plurality of check suites that failed during that time interval of the monitoring period to an amount of time of the time interval of the monitoring period.

24. A method for automated uptime determination of internet-based software, the method comprising:

storing a plurality of check suites, wherein each check suite of the plurality of check suites comprises an ordered sequence of a plurality of checks corresponding to an execution flow of an ordered sequence of functions of the internet-based software;

determining a total amount of downtime for a monitoring period by:

during each time interval of the monitoring period, performing each check suite of the plurality of check suites on the internet-based software, and applying at least one weighing factor to results of performing each check suite of the plurality of check suites on the internet-based software, and wherein determining the total amount of downtime for the monitoring period comprises, for each time interval of the monitoring period, store, an indication of downtime if any check suite of the plurality of check suites failed during the time interval of the monitoring period; and wherein the check suite of the plurality of check suites fails if at least one check of the check suite of the plurality of check suites on a function fails; and wherein one or more processors are located in a plurality of geolocations, wherein the one or more processors comprise at least a first processor in a first geolocation and at least a second processor in a second geolocation which is different from the first geolocation, and wherein the one or more processors are configured to:

for each time interval of the monitoring period, at each geolocation of the plurality of geolocations, perform each check suite of the plurality of check suites on the internet-based software; and store, in one or more memories, an indication of downtime for a time interval only if the at least one check of the check suite of the plurality of check suites failed in each geolocation of the plurality of geolocations during the time interval of the monitoring period.

25. A method for automated uptime determination of internet-based software, the method comprising:

storing a plurality of check suites, wherein each check suite of the plurality of check suites comprises an ordered sequence of a plurality of checks corresponding to an execution flow of an ordered sequence of functions of the internet-based software;

determining a total amount of downtime for a monitoring period by:

during each time interval of the monitoring period, performing each check suite of the plurality of check suites on the internet-based software, and applying at least one weighing factor to results of performing each check suite of the plurality of check suites on the internet-based software, and wherein determining the total amount of downtime for the monitoring period comprises, for each time interval of the monitoring period, store, an indication of downtime if any check suite of the plurality of check suites failed during the time interval of the monitoring period; and wherein the check suite of the plurality of check suites fails if at least one check of the check suite of the plurality of check suites on a function fails; and for each check of the at least one check of the check suite of the plurality of check suites, stopping performing the check suite of the plurality of check suites in response to a check of the check suite of the plurality of check suites on a function failing; and for each time interval of the monitoring period having a stored indication of downtime, dividing an amount of checks of the check suite of the plurality of check suites performed by a total amount of checks of the check suite of the plurality of check suites.

* * * * *